(12) United States Patent
Yoshida et al.

(10) Patent No.: US 8,506,449 B2
(45) Date of Patent: Aug. 13, 2013

(54) CONTROL SYSTEM

(75) Inventors: Takashi Yoshida, Anjo (JP); Yomei Hakumura, Toyokawa (JP); Jin Izawa, Obu (JP); Yoichi Tajima, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 403 days.

(21) Appl. No.: 13/039,657

(22) Filed: Mar. 3, 2011

(65) Prior Publication Data

US 2011/0245034 A1 Oct. 6, 2011

(30) Foreign Application Priority Data

Mar. 31, 2010 (JP) ................................ 2010-080561

(51) Int. Cl.
*B60W 10/02* (2006.01)
*B60W 10/08* (2006.01)

(52) U.S. Cl.
USPC .............................................. 477/5; 477/180

(58) Field of Classification Search
USPC .............................. 477/5, 174, 176, 180, 181
See application file for complete search history.

(56) References Cited

U.S. PATENT DOCUMENTS

| | | | |
|---|---|---|---|
| 6,342,027 B1 * | 1/2002 | Suzuki | 477/5 |
| 2007/0114082 A1 | 5/2007 | Nozaki et al. | |
| 2008/0064560 A1 * | 3/2008 | Popp et al. | 477/5 |
| 2008/0182722 A1 * | 7/2008 | Colvin et al. | 477/180 |
| 2011/0118078 A1 * | 5/2011 | Kraska et al. | 477/5 |

FOREIGN PATENT DOCUMENTS

| | | |
|---|---|---|
| JP | A-11-82260 | 3/1999 |
| JP | A-2007-131071 | 5/2007 |
| JP | A-2008-179235 | 8/2008 |
| JP | A-2008-207643 | 9/2008 |
| JP | A-2009-035188 | 2/2009 |

OTHER PUBLICATIONS

May 24, 2011 International Search Report issued in PCT/JP2011/053204 (with translation).

* cited by examiner

*Primary Examiner* — Justin Holmes
*Assistant Examiner* — Huan Le
(74) *Attorney, Agent, or Firm* — Oliff & Berridge, PLC

(57) ABSTRACT

A control system configured with a speed change mechanism. When starting combustion in an internal combustion engine under a combustion-stopped vehicle running condition, the combustion in the internal combustion engine is stopped, the speed change mechanism forms the one-way transmission speed, and the output member rotates. A rotational speed feedback control is executed that sets a value that multiplies a rotational speed of the output member by a speed ratio of the one-way transmission speed as a reference rotational speed of the input member, sets a starting rotational speed, and controls a rotary electric machine such that the rotational speed of the input member matches the target rotational speed. During execution of the rotational speed feedback control, a start control is performed that increases engagement pressure of the clutch to increase a rotational speed of the internal combustion engine and start combustion in the internal combustion engine.

5 Claims, 10 Drawing Sheets

|  | C1 | C2 | C3 | B1 | B2 | F |
|---|---|---|---|---|---|---|
| Ntl |  |  |  |  |  |  |
| 1st | ○ |  |  |  | (○) | △ |
| 2nd | ○ |  |  | ○ |  |  |
| 3rd | ○ |  | ○ |  |  |  |
| 4th | ○ | ○ |  |  |  |  |
| 5th |  | ○ | ○ |  |  |  |
| 6th |  | ○ |  | ○ |  |  |
| Rev |  |  | ○ |  | ○ |  |

(○): ENGINE BRAKE IN OPERATION OR REGENERATIVE POWER GENERATION

CONTROL SYSTEM

INCORPORATION BY REFERENCE

The disclosure of Japanese Patent Application No. 2010-080561 filed on Mar. 31, 2010 including the specification, drawings and abstract is incorporated herein by reference in its entirety.

BACKGROUND OF THE INVENTION

The present invention relates to a control system that performs a control of a hybrid vehicle drive system that includes: an input member that is drivingly connected to a rotary electric machine; a clutch that selectively and drivingly connects the input member to an internal combustion engine; an output member that is drivingly connected to a wheel; and a speed change mechanism that has a plurality of shift speeds selectively formed by controlling the engagement and disengagement of a plurality of engagement elements, and changes a rotational speed of the input member by a speed ratio of the respective shift speeds and transmits the changed rotational speed to the output member.

DESCRIPTION OF THE RELATED ART

Hybrid vehicles that use an internal combustion engine and a rotary electric machine in combination to improve the fuel economy of the internal combustion engine and reduce emissions have been put into practical use. An example of a hybrid drive system used in this type of hybrid vehicle is described in Japanese Patent Application Publication No. JP-A-H11-82260, wherein an on-vehicle hybrid drive device includes an internal combustion engine, a rotary electric machine that is drivingly connected to a wheel, and a clutch that selectively and drivingly connects the internal combustion engine and the rotary electric machine to each other. In such a hybrid vehicle drive system, the vehicle runs electrically on the output torque from the rotary electric machine with the clutch disengaged and the combustion and rotation of the internal combustion engine stopped. If there is a request to start the internal combustion engine while running electrically, the engagement pressure of the clutch is increased to transmit the rotation of the rotary electric machine to the internal combustion engine, thus increasing the rotational speed of the internal combustion engine and starting the internal combustion engine. According to the art described in JP-A-H11-82260, when starting the internal combustion engine, the speed change mechanism forms a shift speed using a one-way clutch that enables only torque transmission from the rotary electric machine to the wheel side, and the reverse drive torque from the wheel side can be blocked from reaching the rotary electric machine side. The engagement pressure of the clutch is then increased to increase the rotational speed of the internal combustion engine and start combustion in the internal combustion engine.

With the art described in JP-A-H11-82260, while increasing the engagement pressure of the clutch so that the internal combustion engine starts cranking to increase its rotational speed, the output torque of the rotary electric machine is also raised to add a required amount of torque to the cranking of the internal combustion engine in a feed-forward manner. However, if the added torque is smaller than the actual cranking torque, the increase in the engagement pressure of the clutch is accompanied by a drop in the rotational speed of the rotary electric machine, and it may not be possible to start the internal combustion engine. Conversely, if the added torque is larger than the actual cranking torque, a torque that is larger than the driving force requested by the driver and more than is needed for starting the internal combustion engine is transmitted to the wheel side, which may give the driver a sense of incongruity. If the cranking of the internal combustion engine is accompanied by fluctuations in the actual cranking torque, there is the possibility of fluctuations in the rotational speed of the rotary electric machine and repeated disengagement and engagement of the one-way clutch. In such case, a problem occurs because the driving force transmitted to the wheel side also fluctuates.

SUMMARY OF THE INVENTION

In view of the foregoing problem, a control system is desired that, under circumstances where a clutch that selectively and drivingly connects an internal combustion engine and a rotary electric machine to each other is disengaged and combustion in the internal combustion engine is stopped while an output member of a speed change mechanism rotates, can reliably start the internal combustion engine when engaging the clutch and starting combustion in the internal combustion engine, and can suppress the transmission of torque fluctuations generated by the internal combustion engine to the wheel side.

To achieve the above, according to the present invention, a control system performs a control of a hybrid vehicle drive system that includes: an input member that is drivingly connected to a rotary electric machine; a clutch that selectively and drivingly connects the input member to an internal combustion engine; an output member that is drivingly connected to a wheel; and a speed change mechanism that includes a plurality of engagement elements, has a plurality of shift speeds selectively formed by controlling the engagement and disengagement of the plurality of engagement elements, and changes a rotational speed of the input member by a speed ratio of the respective shift speeds and transmits the changed rotational speed to the output member. In the control system, the speed change mechanism includes a one-way transmission speed as one of the plurality of shift speeds, the one-way transmission speed being a shift speed at which a rotary driving force is transmitted from the input member to the output member and a rotary driving force is not transmitted from the output member to the input member. Further, when starting combustion in the internal combustion engine under a combustion-stopped vehicle running condition in which the clutch is disengaged, combustion in the internal combustion engine is stopped, the speed change mechanism forms the one-way transmission speed, and the output member rotates, a rotational speed feedback control is executed that sets a value that multiplies a rotational speed of the output member by a speed ratio of the one-way transmission speed as a reference rotational speed of the input member, sets a starting rotational speed that is lower than the reference rotational speed as a target rotational speed, and controls the rotary electric machine such that the rotational speed of the input member matches the target rotational speed. During execution of the rotational speed feedback control, a start control is performed that increases an engagement pressure of the clutch to increase a rotational speed of the internal combustion engine and start combustion in the internal combustion engine.

Note that, in the present application, the "speed ratio" is a ratio of the rotational speed of the input member and the rotational speed of the output member, and is restricted by the number of teeth of the gears and the like that form each shift speed when the shift speeds are formed in the speed change mechanism. In the present application, the speed ratio is a value that divides the rotational speed of the input member by the rotational speed of the output member.

In addition, "drivingly connected" in the present application refers to a state in which two rotation elements are connected capable of transmitting a driving force, and is used as a concept that includes a state in which the two rotation elements are coupled so as to rotate together, or a state in which the two rotation elements are coupled capable of transmitting a driving force through one, two, or more transmission members. Such transmission members include various types of members that transmit a rotation at the same speed or a changed speed, and include a shaft, a gear mechanism, an engagement element, a belt, and a chain, for example. However, when "drivingly connected" is used in the context of rotation elements of a differential gear device or a differential mechanism, "drivingly connected" refers to a state in which three or more rotation elements provided in the differential gear device or the differential mechanism are drivingly connected to one another directly and not through other rotation elements.

In the present application, the "rotary electric machine" is used as a concept that includes any one of a motor (electric motor), a generator (electric generator), and a motor/generator that carries out both the functions of a motor and a generator as necessary.

According to the configuration described above, when increasing the engagement pressure of the clutch to start combustion in the internal combustion engine, the speed change mechanism forms the one-way transmission speed, and the rotational speed of the input member that is on the input side of the speed change mechanism is controlled so as to become the starting rotational speed that is lower than the reference rotational speed. Therefore, torque transmission from the input member to the output member is cut off. Thus, torque fluctuations generated by the start of combustion in the internal combustion engine and engagement of the clutch can be prevented from being transmitted from the input member to the output member and the wheel.

The rotational speed of the input member is subjected to a rotational speed feedback control performed by the rotary electric machine that actively sets the rotational speed of the input member to the starting rotational speed. Therefore, even if the rotational speed of the input member is affected by disturbance factors caused by variations in the transmission torque of the clutch, variations in the output torque of the internal combustion engine, or other variations, the rotational speed of the input member is maintained at the starting rotational speed. Thus, even if a disturbance factor occurs, through the rotational speed feedback control of the rotary electric machine it is possible to maintain a state in which torque transmission from the input member to the output member is cut off using the one-way transmission speed.

Regardless of whether a torque is transmitted from the input member to the internal combustion engine due to increasing the engagement pressure of the clutch, the rotational speed of the input member can be automatically maintained at the starting rotational speed through the rotational speed feedback control of the rotary electric machine. A drop in the rotational speed of the input member can thus be prevented, and combustion in the internal combustion engine can be reliably started by transmitting the rotary driving force from the input member to the internal combustion engine.

In the case of a return to a normal control after combustion in the internal combustion engine is started and engagement of the clutch is complete, the initial state of the rotational speed of the input member can be made uniform and a return control can be stabilized because the rotational speed of the input member is maintained at the starting rotational speed.

Here, it is preferable that at least one of the plurality of engagement elements is a one-way clutch, and the one-way transmission speed is formed by the one-way clutch and engagement of at least one of the plurality of engagement elements other than the one-way clutch.

According to this configuration, use of the one-way clutch enables easy formation of the one-way transmission speed. In other words, the one-way clutch engages in one direction of rotation and disengages in the other direction of rotation. Therefore, the one-way transmission speed that transmits the rotary driving force in one direction and does not transmit the rotary driving force in the other direction can be formed without requiring a special control or the like.

Here, the control system according to an aspect of the present invention preferably has a configuration in which, once the internal combustion engine starts combustion and the clutch completes engagement, the target rotational speed is changed and set to a rotational speed that matches the reference rotational speed, and execution of the rotational speed feedback control is continued, with the rotational speed feedback control being terminated following synchronization of the rotational speed of the input member and the reference rotational speed.

According to this configuration, once the internal combustion engine starts combustion and the clutch completes engagement, the rotational speed feedback control of the rotary electric machine synchronizes the rotational speed of the input member with the reference rotational speed. Therefore, the driving forces of the internal combustion engine and the rotary electric machine can be transmitted through the one-way transmission speed from the input member to the output member without delay after synchronization to accelerate the vehicle.

Since the rotational speed of the input member is synchronized with the reference rotational speed through the rotational speed feedback control of the rotary electric machine, behavior when the rotational speed of the input member synchronizes with the reference rotational speed can be made stable, and torque shock at the moment of synchronization can be eased.

Here, it is preferable that the combustion-stopped vehicle running condition is further a condition in which transmission of a driving force to the output member is not required.

According to this configuration, the combustion-stopped vehicle running condition is a state in which transmission of a driving force to the output member is not required. Therefore, even if the one-way transmission speed controls the torque from the input member of the speed change mechanism so that it is not transmitted to the output member, there is no risk of transmitting an insufficient driving force to the wheel and giving the driver a sense of incongruity.

Here, the control device according to an aspect of the present invention preferably has a configuration in which an amplitude of the rotational speed of the input member during execution of the rotational speed feedback control is a feedback control amplitude, and the starting rotational speed is set to a rotational speed that is lower than the reference rotational speed by a rotational speed that adds a predetermined margin to the feedback control amplitude.

According to this configuration, the starting rotational speed can be set to a rotational speed that is as near as possible to the reference rotational speed within a range capable of preventing torque transmission from the input member to the output member. Thus, time spans for decreasing the rotational speed of the input member from the reference rotational speed to the starting rotational speed and for conversely increasing the rotational speed of the input member from the starting rotational speed to the reference rotational speed can be shortened. It is also possible to suppress a rise in a rate of acceleration of the rotational speed of the input member during such increasing and decreasing, and in particular, suppress the generation of torque shock at the moment the rotational speed of the input member increases from the starting rotational speed and synchronizes with the reference rotational speed.

DETAILED DESCRIPTION OF THE EMBODIMENTS

1. First Embodiment

Figure 1:
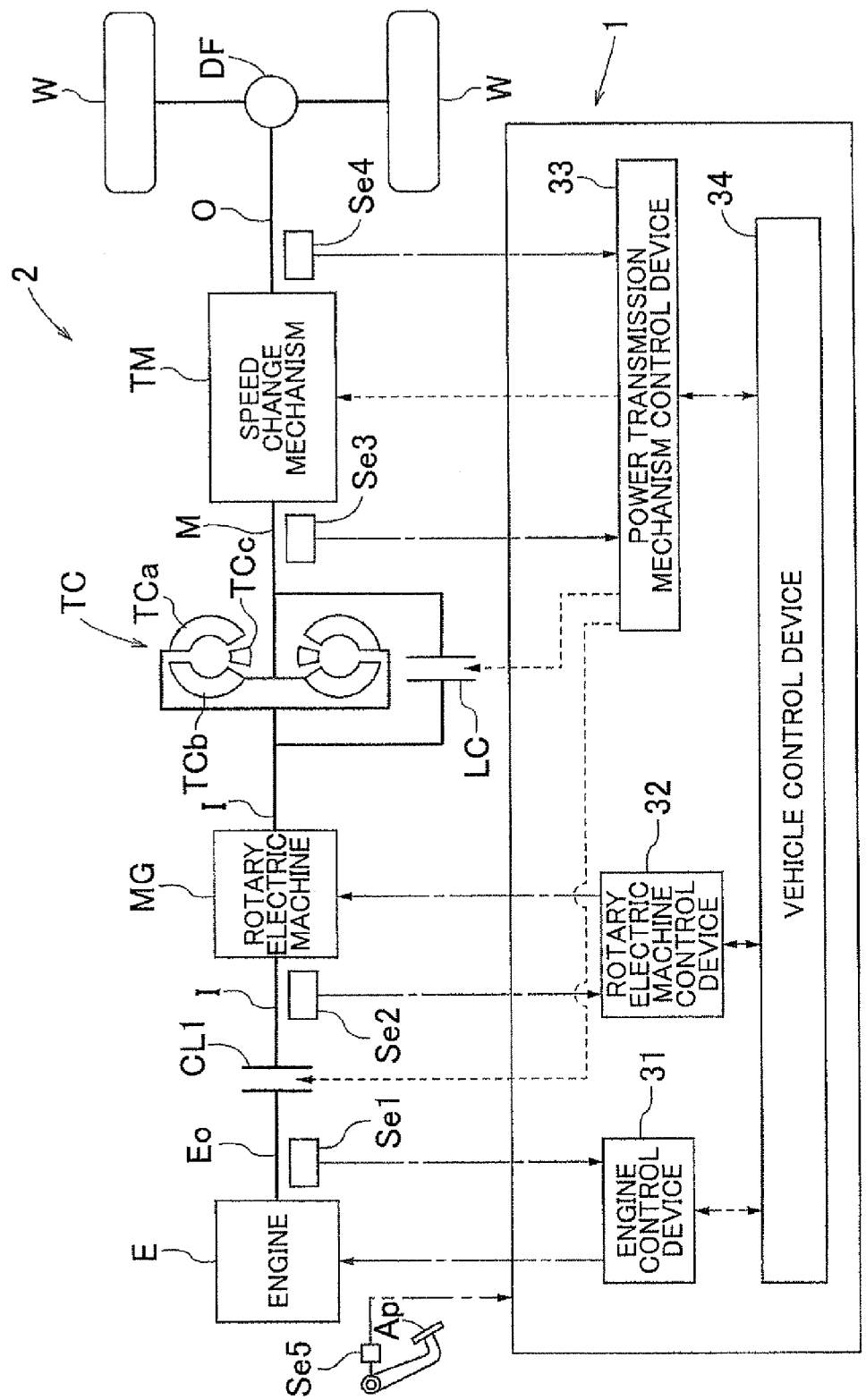
FIG. 1 is a schematic diagram that shows the configuration of a hybrid vehicle drive system and a control system according to a first embodiment of the present invention.

A first embodiment of a control system 1 according to the present invention will be described with reference to the drawings. The control system 1 performs a control of a hybrid vehicle drive system 2 that includes an input shaft I, a transmission clutch CL1, an output shaft O, and a speed change mechanism TM. The input shaft I serves as an input member that is drivingly connected to a rotary electric machine MG. The transmission clutch CL1 selectively and drivingly connects the input shaft I to an engine E that is an internal combustion engine. The output shaft O serves as an output member that is drivingly connected to a wheel W. The speed change mechanism TM includes a plurality of engagement elements, and has a plurality of shift speeds selectively formed by controlling the engagement and disengagement of the plurality of engagement elements. A rotational speed of the input shaft I is changed by a speed ratio of the respective shift speeds and transmitted to the output shaft O by the speed change mechanism TM. In the following description, the hybrid vehicle drive system 2 is simply called a "drive system 2" as appropriate. FIG. 1 is a schematic diagram that shows the overall configuration of the drive system 2 and the control system 1 according to the present embodiment. In the present embodiment, the rotary electric machine MG is drivingly connected to the speed change mechanism TM through a torque converter TC. Note that in FIG. 1, solid lines indicate a transmission path of a driving force (torque), dashed lines indicate a supply path of hydraulic pressure, and dashed-dotted lines indicate a transmission path of an electrical signal.

The drive system 2 uses the engine E and the rotary electric machine MG as drive power sources. By selectively and drivingly connecting the transmission clutch CL1, the drive system 2 can run the vehicle while, depending on the running condition, appropriately switching between an electric running mode in which the vehicle runs using only the rotary electric machine MG as the drive power source, and a parallel running mode in which the vehicle runs using at least the engine E as the drive power source. It should be noted that in the present application, "driving force" is used as a concept that includes torque.

According to the present embodiment, the control system 1 is constituted from an engine control device 31, a rotary electric machine control device 32, a power transmission mechanism control device 33, and a vehicle control device 34. The control system 1 is configured so as to control the engine E, the transmission clutch CL1, the rotary electric machine MG, a lock-up clutch LC of the torque converter TC, and the speed change mechanism TM, which all constitute the drive system 2.

The speed change mechanism TM according to the present embodiment includes, as one of a plurality of shift speeds, a one-way transmission speed that is a shift speed at which a rotary driving force is transmitted from the input shaft I (intermediate shaft M) to the output shaft O, but a rotary driving force is not transmitted from the output shaft O to the input shaft I (intermediate shaft M).

The control system 1 according to the present embodiment has a characteristic of performing a control to start combustion in the engine E under a combustion-stopped vehicle running condition in which the transmission clutch CL1 is disengaged, combustion in the engine E is stopped, the speed change mechanism TM forms the one-way transmission speed, and the output shaft O rotates. In other words, the control system 1 executes a rotational speed feedback control that, when starting combustion in the engine E, first, sets a value that multiplies the rotational speed of the output shaft O by the speed ratio of the one-way transmission speed as a reference rotational speed of the input shaft I, sets a starting rotational speed that is lower than the reference rotational speed as a target rotational speed, and controls the rotary electric machine MG such that the rotational speed of the input shaft I matches the target rotational speed. During execution of the rotational speed feedback control, a start control is performed that starts combustion in the engine E by increasing the engagement pressure of the transmission clutch CL1 to increase the rotational speed of the engine E. The control system 1 according to the present embodiment will be described in detail below. Note that the transmission clutch CL1 corresponds to a "clutch" of the present invention.

The engine E is an internal combustion engine that is driven by fuel combustion. Various types of commonly known engines may be used, including a spark ignition engine such as a gasoline engine and a compression ignition engine such as a diesel engine, for example. In the following description of the present embodiment, an example that uses a gasoline engine as the engine E will be explained. The engine E is drivingly connected to the rotary electric machine MG in a selective manner by the transmission clutch CL1. In the present embodiment, an engine output shaft Eo such as a crankshaft of the engine E is drivingly connected to the input shaft I in a selective manner by the transmission clutch CL1. The input shaft I is drivingly connected to a rotor of the rotary electric machine MG so as to rotate together with the rotor. The transmission clutch CL1 is a friction engagement element in the present embodiment, and the friction engagement element is configured so as to engage and disengage based on the hydraulic pressure supplied. A wet multi-disc clutch, a dry clutch, or the like, for example, is well suited for use as this type of clutch.

The rotary electric machine MG is configured with the rotor and a stator. The rotary electric machine MG can function as a motor (electric motor) that receives a supply of electric power to generate motive power, and also function as a generator (electric generator) that receives a supply of motive power to generate electric power. Therefore, the rotary electric machine MG is electrically connected to an electric storage device that is not shown in the drawings. In the present example, a battery is used as the electric storage device. Note that a capacitor or the like is also well suited for use as the electric storage device. The rotary electric machine MG receives a supply of electric power from the battery for power running, and supplies electric power generated by the driving force transmitted from the wheel W or the engine E to the battery to accumulate electric power in the battery. In addition, the rotor of the rotary electric machine MG that rotates together with the input shaft I is drivingly connected to the speed change mechanism TM through the torque converter TC.

The torque converter TC is a device that transmits the torque of the input shaft I, which is transmitted from the rotary electric machine MG or the engine E, to the intermediate shaft M through a fluid coupling or the lock-up clutch LC. The torque converter TC is configured by including a pump impeller TCa serving as an input rotation member that is drivingly connected to the input shaft I, and a turbine runner TCb serving as an output rotation member that is drivingly connected to the intermediate shaft M. The torque converter TC functions as a fluid coupling in which a torque is transmitted between the pump impeller TCa on a driving side and the turbine runner TCb on a driven side through operation oil provided inside the torque converter TC. At such time, the torque from the input rotation member is converted into a torque for the output rotation member by a predetermined torque ratio that varies depending on a ratio of the rotational speed of the input rotation member to the rotational speed of the output rotation member.

The torque converter TC includes the lock-up clutch LC as friction engagement mechanism for lock-up. The lock-up clutch LC is a clutch that connects the pump impeller TCa and the turbine runner TCb so that they rotate together in order to eliminate a difference in rotation (slip) between the pump impeller TCa and the turbine runner TCb and increase transmission efficiency. In the torque converter TC, since the driving force of the input shaft I is directly transmitted to the intermediate shaft M without passing through operation oil while the lock-up clutch LC is engaged, there is no difference in the torque or the rotational speed between the rotation shafts on the driving side and the driven side. The lock-up clutch LC is a friction engagement element in the present embodiment, and the friction engagement element is configured so as to engage and disengage based on the hydraulic pressure supplied. A wet multi-disc clutch or the like, for example, is well suited for use as this type of friction engagement element. Unless otherwise noted, the lock-up clutch LC is engaged and the input shaft I and the intermediate shaft M rotate together in the present embodiment.

The speed change mechanism TM is a mechanism that changes the rotational speed of the intermediate shaft M and transmits the changed rotational speed to the output shaft O. In the present embodiment, the speed change mechanism TM is a stepped automatic transmission that has a plurality of shift speeds with different speed ratios. In order to form the plurality of shift speeds, the speed change mechanism TM includes a gear mechanism such as a planetary gear mechanism, and a plurality of engagement elements such as clutches and brakes that engage and disengage rotation elements of the gear mechanism to change the shift speed. At least one of the plurality of engagement elements is a one-way clutch in the present embodiment. The speed change mechanism TM changes the rotational speed of the intermediate shaft M by a predetermined speed ratio set for each shift speed and converts the torque, which the speed change mechanism TM transmits to the output shaft O. The torque transmitted from the speed change mechanism TM to the output shaft O is distributed and transmitted to both the right and left wheels W through a differential device DF.

In the present embodiment, each engagement element other than the transmission clutch CL1, the lock-up clutch LC, and the one-way clutch of the speed change mechanism TM is a friction engagement element that transmits a torque between input and output members through friction between the input and output members. Transmission torque capacity is the magnitude of a maximum torque that can be transmitted by the friction engagement element through friction. If there is a rotational speed difference (slip) between the input and output rotation members of the friction engagement element, a torque of the magnitude of the transmission torque capacity is transmitted from the member with the larger rotational speed to the member with the smaller rotational speed. If there is no rotational speed difference (slip) between the input and output members of the friction engagement element, a torque that acts on the input and output members of the friction engagement element is transmitted with the magnitude of the transmission torque capacity serving as an upper limit. The magnitude of the transmission torque capacity changes in proportion to the magnitude of the hydraulic pressure supplied to the friction engagement element.

Each friction engagement element includes a return spring, and the friction engagement elements are biased toward a disengagement side by the reaction force of the spring. If the force generated by the hydraulic pressure supplied to each friction engagement element exceeds the reaction force of the spring, the friction engagement elements begin to have a transmission torque capacity, and the friction engagement elements change from a disengaged state to an engaged state. The hydraulic pressure at which the transmission torque capacity starts to occur is called a stroke end pressure. After the supplied hydraulic pressure exceeds the stroke end pressure, each friction engagement element is configured so as to increase its transmission torque capacity in proportion to the increase in the hydraulic pressure.

2. Configuration of Speed Change Mechanism

In the present embodiment, the speed change mechanism TM includes six forward shift speeds (first speed, second speed, third speed, fourth speed, fifth speed, and sixth speed) with different speed ratios (reduction ratios). In order to form these shift speeds, the speed change mechanism TM is configured by including a gear mechanism that has a first planetary gear device P1 and a second planetary gear device P2; and a plurality of engagement elements. Switching among the six shift speeds is achieved by controlling the engagement and disengagement of the plurality of engagement elements to change the rotation state of rotation elements of the first planetary gear device P1 and the second planetary gear device P2, and selectively engaging two among the plurality of the engagement elements. Note that the speed change mechanism TM also includes a first reverse speed in addition to the above six shift speeds.

Figures 3, 4:
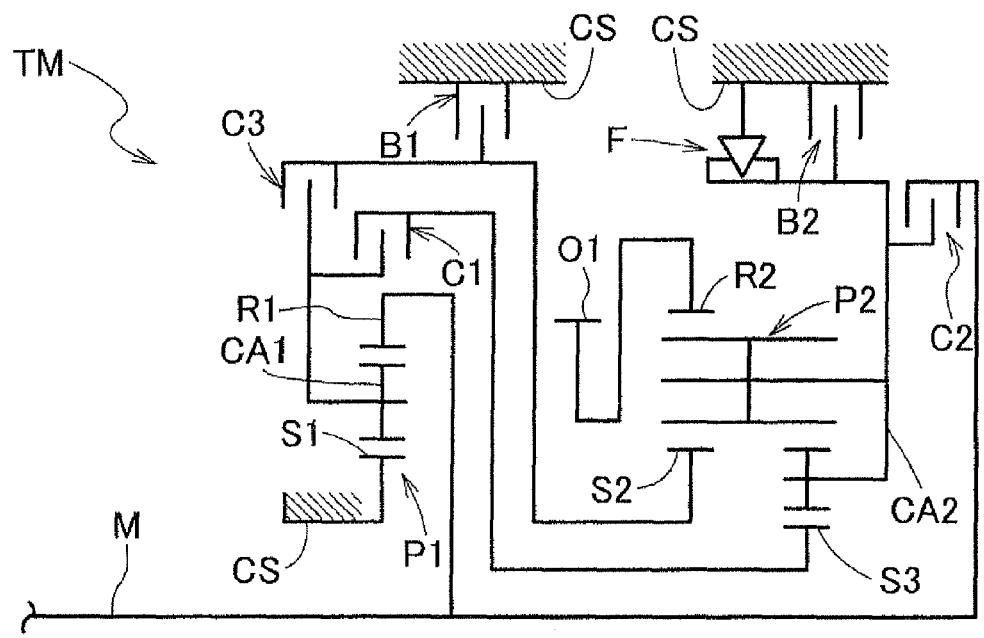
FIG. 3 is a skeleton diagram of a speed change mechanism according to the first embodiment of the present invention.
FIG. 4 is a drawing that shows an operation chart of the speed change mechanism according to the first embodiment of the present invention.

FIG. 3 is a skeleton diagram of the speed change mechanism TM according to the present embodiment. As this figure shows, the speed change mechanism TM is configured by including a planetary gear mechanism that combines the two sets of planetary gear devices P1, P2. The speed change mechanism TM includes a plurality of engagement elements C1, C2, C3, B1, B2, F that correspond to the rotation elements configuring the planetary gear mechanism. Specifically, the speed change mechanism TM includes, as the engagement elements, the first clutch C1, the second clutch C2, the third clutch C3, the first brake B1, the second brake B2, and the one-way brake F serving as a one-way clutch.

FIG. 4 is a drawing that shows an operation chart of the engagement elements C1, C2, C3, B1, B2, F. In the present embodiment, as described above, the speed change mechanism TM includes six forward shift speeds (first speed, second speed, third speed, fourth speed, fifth speed, and sixth speed) with different speed ratios (reduction ratios), and also one reverse speed. The first speed has the largest speed ratio, followed by the second speed, third speed, fourth speed, fifth speed, and sixth speed. In FIG. 4, "1st" indicates the first speed, "2nd" indicates the second speed, "3rd" indicates the third speed, "4th" indicates the fourth speed, "5th" indicates the fifth speed, "6th" indicates the sixth speed, and "Rev" indicates the reverse speed. "Ntl" indicates a neutral state in which no shift speed is formed. In the operation chart of the figure, a circle (O) indicates that an engagement element is engaged. No mark indicates that an engagement element is disengaged. A triangle (Δ) indicates that the one-way brake F is applied. Further, "(O)" indicates that the second brake B2 is engaged instead of the one-way brake F under a predetermined requirement such as the engine brake in operation, regenerative power generation, or the like.

In the present embodiment, as shown in FIG. 3, the first planetary gear device P1 is a single-pinion type planetary gear mechanism that is coaxially disposed with the intermediate shaft M. Specifically, the first planetary gear device P1 is configured with three rotation elements: a carrier CA1 that supports a plurality of pinion gears; and a sun gear S1 and a ring gear R1 that each mesh with a pinion gear. The second planetary gear device P2 is a Ravigneaux type planetary gear mechanism that is coaxially disposed with the intermediate shaft M. Specifically, the second planetary gear device P2 is configured with four rotation elements: two sun gears, namely, a first sun gear S2 and a second sun gear S3; a ring gear R2; and a common carrier CA2 that supports a long pinion gear that meshes with both the first sun gear S2 and the ring gear R2, and a short pinion gear that meshes with the long pinion gear and the second sun gear S3.

The sun gear S1 of the first planetary gear device P1 is fixed to a case CS serving as a non-rotation member. The carrier CA1 is drivingly connected so as to selectively rotate together with the second sun gear S3 of the second planetary gear device P2 through the first clutch C1, and drivingly connected so as to selectively rotate together with the first sun gear S2 of the second planetary gear device P2 through the third clutch C3. The ring gear R1 is drivingly connected so as to rotate together with the intermediate shaft M, and drivingly connected so as to selectively rotate together with the carrier CA2 of the second planetary gear device P2 through the second clutch C2. Note that these three rotation elements are, in order of rotational speed, the sun gear S1, the carrier CA1, and the ring gear R1.

The first sun gear S2 of the second planetary gear device P2 is drivingly connected so as to selectively rotate together with the carrier CA1 of the first planetary gear device P1 through the third clutch C3. The carrier CA2 is drivingly connected so as to selectively rotate together with the intermediate shaft M and the ring gear R1 of the first planetary gear device P1 through the second clutch C2, and selectively fixed to the case CS serving as a non-rotation member through the second brake B2 or the one-way brake F. The ring gear R2 is drivingly connected so as to rotate together with an output gear O1. The second sun gear S3 is drivingly connected so as to selectively rotate together with the carrier CA1 of the first planetary gear device P1 through the first clutch C1. Note that these four rotation elements are, in order of rotational speed, the first sun gear S2, the carrier CA2, the ring gear R2, and the second sun gear S3. Further note that the output gear O1 is drivingly connected to the output shaft O in FIG. 1. Here, the one-way brake F selectively fixes the carrier CA2 to the case CS by stopping rotation only in one direction. In the present example, the one-way brake F is configured so as to engage when the carrier CA2 of the second planetary gear device P2 has a negative rotation.

Figure 5:
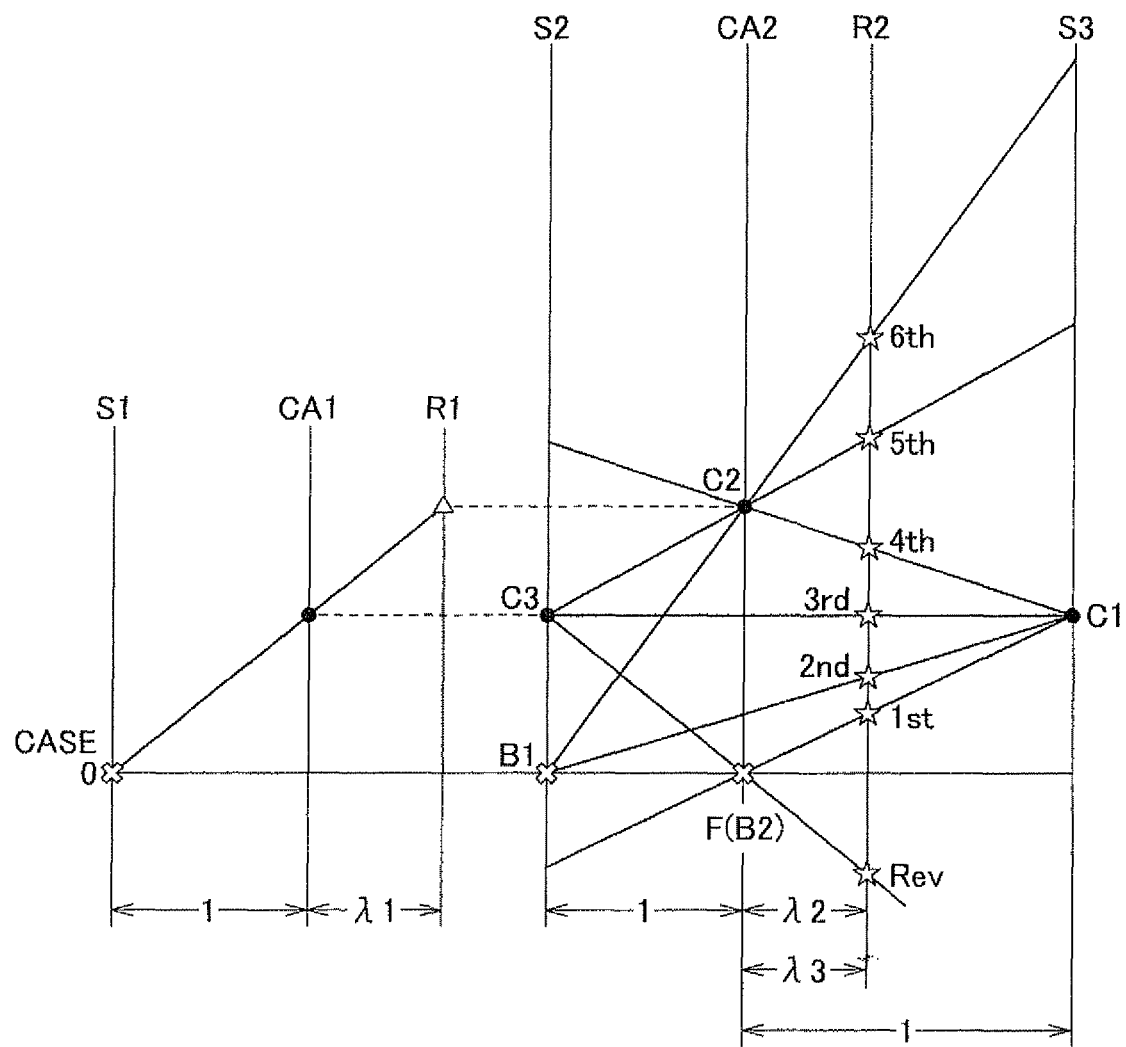
FIG. 5 is a drawing that shows a speed line map of the speed change mechanism according to the first embodiment of the present invention.

FIG. 5 is a speed line map of the speed change mechanism TM. In the speed line map, the vertical axis corresponds to the rotational speed of each rotation element. Specifically, "0" written corresponding to the vertical axis indicates that the rotational speed is zero; the side above "0" is a positive rotation (positive rotational speed) and the side below "0" is a negative rotation (negative rotational speed). Each of a plurality of vertical lines arranged in a row respectively correspond to the rotation elements of the first planetary gear device P1 and the rotation elements of the second planetary gear device P2. Specifically, vertical lines with "S1, "CA1, and "R1" written at the top respectively correspond to the sun gear S1, the carrier CA1, and the ring gear R1 of the first planetary gear device P1. Similarly, vertical lines with "S2, "CA2, "R2", and "S3" written at the top respectively correspond to the first sun gear S2, the carrier CA2, the ring gear R2, and the second sun gear S3 of the second planetary gear device P2. Intervals between the plurality of vertical lines arranged in a row are determined based on a gear ratio λ of the planetary gear devices P1, P2 (gear ratio of sun gear and ring gear=[number of teeth of sun gear]/[number of teeth of ring gear]).

A triangle (Δ) indicates that the intermediate shaft M is drivingly connected to the rotation element. A cross (x) indicates that the rotation element is fixed to the case CS by the first brake B1, the second brake B2, or the one-way brake F. A star (☆) indicates that the wheel and the output shaft O are drivingly connected to the rotation element. Note that "1st", "2nd", "3rd", "4th", "5th", "6th", and "Rev" with stars next to them respectively correspond to the first speed, the second speed, the third speed, the fourth speed, the fifth speed, the sixth speed, and the reverse speed as achieved in the speed change mechanism TM.

As shown in FIGS. 4 and 5, the first speed is achieved through engagement of the first clutch C1 in cooperation with the one-way brake F. Specifically, with the first clutch C1 engaged, the rotary driving force of the intermediate shaft M to be input to the ring gear R1 of the first planetary gear device P1 is decelerated based on a gear ratio λ1, and transmitted to the second sun gear S3 of the second planetary gear device P2. If the rotation and driving force of the intermediate shaft M are transmitted to the output shaft O and the carrier CA2 of the second planetary gear device P2 attempts to negatively rotate while the first clutch C1 is engaged, the one-way brake F engages and fixes the carrier CA2 to the case CS, so that the rotation and driving force of the second sun gear S3 are decelerated based on a gear ratio 73 and transmitted to the output shaft O. Note that the one-way brake F remains disengaged if the rotation and driving force of the output shaft O are transmitted to the intermediate shaft M and the carrier CA2 of the second planetary gear device P2 positively rotates. Accordingly, the one-way brake F switches between engagement and disengagement depending on the direction of rotation, and the first speed is achieved through engagement of the first clutch C1 in cooperation with engagement or disengagement of the one-way brake F. The first speed thus achieved is a one-way shift speed in which the rotary driving force is transmitted from the intermediate shaft M to the output shaft O, but the rotary driving force is not transmitted from the output shaft O to the intermediate shaft M. Note that when the second brake B2 is engaged such as during engine brake operation, regenerative power generation, or the like, the rotary driving force is also transmitted from the output shaft O to the intermediate shaft M and the first speed becomes a two-way shift speed.

The second speed is achieved through engagement of the first clutch C1 in cooperation with engagement of the first brake B1. Specifically, with the first clutch C1 engaged, the rotation and driving force of the intermediate shaft M are decelerated based on the gear ratio $\lambda 1$, and transmitted to the second sun gear S3 of the second planetary gear device P2. In addition, the first sun gear S2 of the second planetary gear device P2 is fixed to the case CS with the first brake B1 engaged. The rotation and driving force of the second sun gear S3 are further decelerated based on a gear ratio $\lambda 2$ and the gear ratio $\lambda 3$, and transmitted to the output shaft O.

The third speed is achieved through engagement of the first clutch C1 in cooperation with engagement of the third clutch C3. Specifically, with the first clutch C1 engaged, the rotation and driving force of the intermediate shaft M are decelerated based on the gear ratio $\lambda 1$, and transmitted to the second sun gear S3 of the second planetary gear device P2. In addition, with the third clutch C3 engaged, the rotation and driving force of the intermediate shaft M are decelerated based on the gear ratio $\lambda 1$, and transmitted to the first sun gear S2 of the second planetary gear device P2. With the first sun gear S2 and the second sun gear S3 rotating at the same rotational speed, the rotation and driving force of the intermediate shaft M decelerated based on the gear ratio $\lambda 1$ are then transmitted to output shaft O.

The fourth speed is achieved through engagement of the first clutch C1 in cooperation with engagement of the second clutch C2. Specifically, with the first clutch C1 engaged, the rotation and driving force of the intermediate shaft M are decelerated based on the gear ratio $\lambda 1$, and transmitted to the second sun gear S3 of the second planetary gear device P2. In addition, with the second clutch C2 engaged, the rotation and driving force of the intermediate shaft M are transmitted without change to the carrier CA2 of the second planetary gear device P2. The rotation and driving force of the intermediate shaft M determined based on the gear ratio $\lambda 3$ and the rotational speeds of the carrier CA2 and the second sun gear S3 are then transmitted to output shaft O.

The fifth speed is achieved through engagement of the second clutch C2 in cooperation with engagement of the third clutch C3. Specifically, with the second clutch C2 engaged, the rotation and driving force of the intermediate shaft M are transmitted without change to the carrier CA2 of the second planetary gear device P2. In addition, with the third clutch C3 engaged, the rotation and driving force of the intermediate shaft M are decelerated based on the gear ratio $\lambda 1$, and transmitted to the first sun gear S2 of the second planetary gear device P2. The rotation and driving force of the intermediate shaft M determined based on the gear ratio $\lambda 2$ and the rotational speeds of the first sun gear S2 and the carrier CA2 are then transmitted to output shaft O.

The sixth speed is achieved through engagement of the second clutch C2 in cooperation with engagement of the first brake B1. Specifically, with the second clutch C2 engaged, the rotation and driving force of the intermediate shaft M are transmitted without change to the carrier CA2 of the second planetary gear device P2. In addition, the first sun gear S2 of the second planetary gear device P2 is fixed to the case CS with the first brake B1 engaged. The rotation and driving force of the carrier CA2 are then accelerated based on the gear ratio $\lambda 2$ and the rotational speed of the carrier CA2, and transmitted to the output shaft O.

The reverse speed is achieved through engagement of the third clutch C1 in cooperation with engagement of the second brake 132. Specifically, with the third clutch C3 engaged, the rotation and driving force of the intermediate shaft M are decelerated based on the gear ratio $\lambda 1$, and transmitted to the first sun gear S2 of the second planetary gear device P2. In addition, the carrier CA2 of the second planetary gear device P2 is fixed to the case CS with the second brake B2 engaged. The rotation and driving force of the first sun gear S2 are then decelerated and reversed based on the gear ratio $\lambda 2$, and transmitted to the output shaft O.

3. Configuration of Control Device

Figure 2:
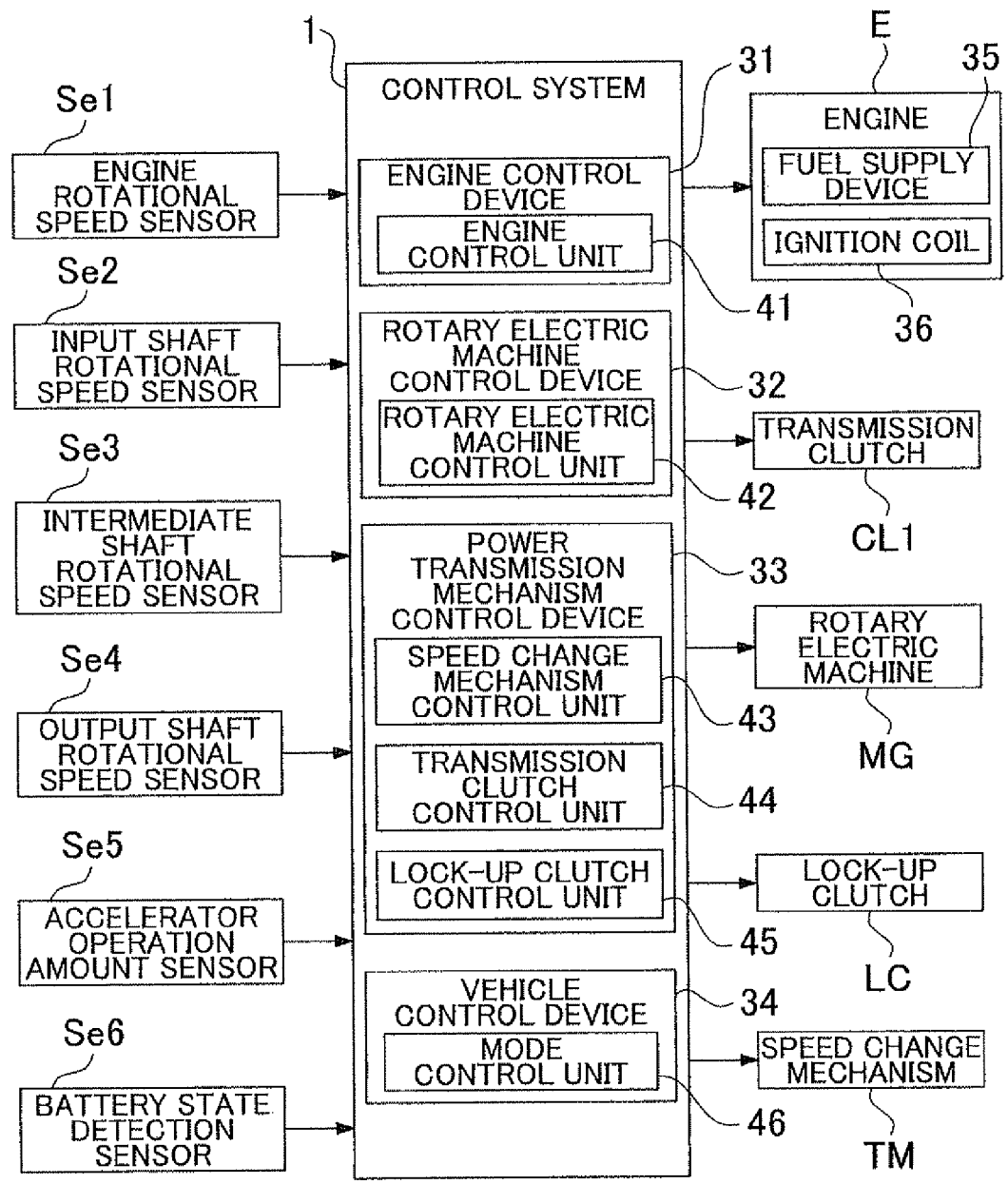
FIG. 2 is a block diagram that shows the configuration of the control system according to the first embodiment of the present invention.

Next, the configuration of the control system 1 that performs a control of the drive system 2 will be described. In the present embodiment, as shown in FIGS. 1 and 2, the control system 1 is constituted from the engine control device 31 that performs a control of the engine E; the rotary electric machine control device 32 that performs a control of the rotary electric machine MG; the power transmission mechanism control device 33 that performs a control of various friction engagement elements including the speed change mechanism TM and the transmission clutch CL1; and the vehicle control device 34 that performs a control of the drive system 2 by integrating these control devices.

Each control device 31 to 34 has as its core member a computation processing device such as a CPU, and is configured with storage devices such as a random access memory (RAM) that is configured capable of reading data from and writing data to the computation processing device, and a read only memory (ROM) that is configured capable of reading data from the computation processing device. Each functional portion 41 to 46 of the control devices 31 to 34 is configured from software (a program) stored in the ROM or the like of each control device, hardware such as a computation circuit separately provided, or both software and hardware. The control devices 31 to 34 are configured so as to communicate with each other, and the control devices 31 to 34 realize the functions of the functional portions 41 to 46 by sharing various types of information such as sensor detection information and control parameters and by performing a cooperative control.

The drive system 2 includes sensors Se1 to Se6, and electrical signals output from each sensor are input to the control system 1. The control system 1 calculates the detection information of each sensor based on the input electrical signals.

The engine rotational speed sensor Se1 is a sensor that detects the rotational speed of the engine output shaft Eo (engine E). The control system 1 calculates the rotational speed of the engine E from the input signal of the engine rotational speed sensor Se1. The input shaft rotational speed sensor Se2 is a sensor that detects the rotational speed of the input shaft I. Because the rotor of the rotary electric machine MG is integratedly and drivingly connected to the input shaft I, the control system 1 calculates the rotational speeds of the input shaft I and the rotary electric machine MG from the input signal of the input shaft rotational speed sensor Se2. The intermediate shaft rotational speed sensor Se3 is a sensor that detects the rotational speed of the intermediate shaft M. From the input signal of the intermediate shaft rotational speed sensor Se3, the control system 1 calculates the output-side rotational speed of the torque converter TC and the input-side rotational speed of the speed change mechanism TM. The output shaft rotational speed sensor Se4 is a sensor that detects the rotational speed of the output shaft O. The control system 1 calculates the output-side rotational speed of the speed change mechanism TM from the input signal of the output shaft rotational speed sensor Se4. Since the rotational speed of the output shaft O is proportional to the vehicle speed, the control system 1 also calculates the vehicle speed from the input signal of the output shaft rotational speed sensor Se4.

The accelerator operation amount sensor Se5 is a sensor that detects an accelerator operation amount by detecting an amount that an accelerator pedal AP is operated by the driver. The control system 1 calculates the accelerator operation amount from the input signal of the accelerator operation amount sensor Se5.

The battery state detection sensor Se6 is a sensor that detects a battery charge amount. The control system 1 calculates the battery charge amount from the input signal of the battery state detection sensor Se6.

3-1. Configuration of Engine Control Device

The engine control device 31 is a control device that performs a control of the engine E. The engine control device 31 is input with the detection information of various sensors such as the engine rotational speed sensor Se1. In addition, the engine control device 31 outputs electrical signals that control a fuel supply device 35 that supplies fuel to a combustion chamber of the engine E, an ignition coil 36 for sparking a spark plug disposed in the combustion chamber, a throttle valve that adjusts an intake air amount that is the amount of air suctioned into the combustion chamber, and the like.

The engine control device 31 includes an engine control unit 41. The engine control unit 41 is a functional portion that performs a control of the engine E. The engine control unit 41 controls the engine E based on an engine request torque Te commanded by a mode control unit 46 provided in the vehicle control device 34 that will be described later, such that the output torque of the engine E matches the engine request torque Te. In other words, the engine request torque Te is a target value of the output torque, which is the torque transmitted from the engine E to the engine output shaft Eo. The actual output torque of the engine E changes in complex ways due to various factors from the positive torque generated by combustion to torque that reduces the magnitude of the negative torque generated by friction, pumping, and the like. The positive torque is roughly proportional to the amount of fuel burned per combustion stroke, and increases and decreases depending on the ignition timing and the like. Meanwhile, the magnitude of the negative torque is proportional to the rotational speed of the engine E, the magnitude of negative pressure inside an intake pipe, and the like. Here, the magnitude of the negative torque generated by pumping is proportional to the magnitude of the negative pressure inside the intake pipe and the like. The magnitude of the negative pressure inside the intake pipe is inversely proportional to the rotational speed of the engine E and the opening of the throttle valve. Note that if combustion in the engine E is stopped, the output torque of the engine E becomes the negative torque of friction, pumping, and the like.

In the present embodiment, the engine control unit 41 controls the fuel supply device 35, the ignition coil 36, the throttle valve, actuators, and the like based on the engine request torque Te, whereby the fuel supply amount, the ignition timing, and the negative pressure inside the intake pipe are adjusted so that the actual output torque of the engine E matches the engine request torque Te.

If the engine control unit 41 receives a command to stop combustion from the mode control unit 46 of the vehicle control device 34, the engine control unit 41 uses the fuel supply device 35 to stop the supply of fuel to the combustion chamber and stops combustion in the engine E. Meanwhile, if the engine control unit 41 receives a command to start combustion from the mode control unit 46 of the vehicle control device 34, the engine control unit 41 uses the fuel supply device 35 to start the supply of fuel to the combustion chamber and starts combustion in the engine E. When starting combustion, the engine control unit 41 follows a starting combustion supply sequence to supply fuel. Note that in the case of a spark ignition engine such as a gasoline engine, the engine control unit 41 may stop and start combustion by stopping and starting ignition through energization of the ignition coil 36. In addition, the engine control unit 41 may determine the stopping and starting of combustion based on the engine request torque Te commanded by the mode control unit 46, and stop and start combustion using the fuel supply device 35 or the ignition coil 36.

3-2. Configuration of Rotary Electric Machine Control Device

The rotary electric machine control device 32 is a control device that performs a control of the rotary electric machine MG. The rotary electric machine control device 32 is input with the detection information of sensors such as the input shaft rotational speed sensor Se2. The rotary electric machine control device 32 includes an inverter that supplies electric power from the battery to the rotary electric machine MG to generate a positive torque, and generates a negative torque in the rotary electric machine MG to supply electric power to the battery.

The rotary electric machine control device 32 includes a rotary electric machine control unit 42. The rotary electric machine control unit 42 is a functional portion that performs a control of the rotary electric machine MG. The rotary electric machine control unit 42 controls the rotary electric machine MG through the inverter based on a motor request torque Tm commanded by the mode control unit 46 of the vehicle control device 34, such that the output torque that is the torque transmitted from the rotary electric machine MG to the input shaft I matches the motor request torque Tm. If the rotary electric machine control unit 42 receives a command for a target rotational speed from the mode control unit 46, the rotary electric machine control unit 42 executes a rotational speed feedback control based on the target rotational speed, which changes the output torque of the rotary electric machine MG through the inverter such that the rotational speed of the rotary electric machine MG matches the target rotational speed.

3-3. Configuration of Power Transmission Mechanism Control Device

The power transmission mechanism control device 33 is a control device that performs a control of the speed change mechanism TM, as well as the transmission clutch CL1 and the lock-up clutch LC. The power transmission mechanism control device 33 is input with the detection information of sensors such as the intermediate shaft rotational speed sensor Se3 and the output shaft rotational speed sensor Se4. The power transmission mechanism control device 33 includes a hydraulic control device that supplies hydraulic pressure at commanded levels to each friction engagement element. The power transmission mechanism control device 33 further includes a speed change mechanism control unit 43, a transmission clutch control unit 44, and a lock-up clutch control unit 45.

3-3-1. Speed Change Mechanism Control Unit

The speed change mechanism control unit 43 is a functional portion that controls the speed change mechanism TM. The speed change mechanism control unit 43 determines a target shift speed for the speed change mechanism TM based on sensor detection information such as the vehicle speed, the accelerator operation amount, and a shift position. The speed change mechanism control unit 43 then controls the hydraulic pressure supplied to each friction engagement element provided in the speed change mechanism TM through the hydraulic control device, thereby engaging or disengaging each friction engagement element to form the shift speed targeted for the speed change mechanism TM. In the electric running mode before transitioning to a parallel running transition mode according to the present embodiment, the target shift speed is set as the one-way transmission speed, and the one-way transmission speed is formed in the speed change mechanism TM.

3-3-2. Transmission Clutch Control Unit

The transmission clutch control unit 44 is a functional portion that controls the transmission clutch CL1. Here, the transmission clutch control unit 44 controls the transmission clutch CL1 by controlling the hydraulic pressure supplied to the transmission clutch CL1 through the hydraulic control device.

In the present embodiment, the transmission clutch control unit 44 controls the hydraulic pressure supplied to the transmission clutch CL1 through the hydraulic control device based on a request transmission torque capacity Tk commanded by the mode control unit 46 provided in the vehicle control device 34, such that the actual transmission torque capacity of the transmission clutch CL1 matches the request transmission torque capacity Tk. For example, the transmission clutch control unit 44 sets the hydraulic pressure to be targeted based on the request transmission torque capacity Tk and a torque capacity characteristic map that stores characteristics of the relation between hydraulic pressure and transmission torque capacity. The transmission clutch control unit 44 then issues a command for the target hydraulic pressure to the hydraulic control device, and the hydraulic control device supplies the hydraulic pressure that is the target hydraulic pressure to the transmission clutch CL1. Note that the torque capacity characteristic map may store characteristics of the relation between hydraulic pressure and the transmission torque capacity Tk depending on the difference in the rotational speeds of the input and output members.

3-3-3. Lock-Up Clutch Control Unit

The lock-up clutch control unit 45 is a functional portion that controls the lock-up clutch LC. The lock-up clutch control unit 45 determines a target state of engagement or disengagement of the lock-up clutch LC based on sensor detection information such as the vehicle speed, the accelerator operation amount, and the shift position. The speed change mechanism control unit 43 then, in accordance with the determined target state, controls the hydraulic pressure supplied to the lock-up clutch LC through the hydraulic control device so as to engage or disengage the lock-up clutch LC. In the parallel running transition mode of the present embodiment, the lock-up clutch LC is engaged.

3-4. Configuration of Vehicle Control Device

The vehicle control device 34 is a control device that performs an overall control of the vehicle that integrates various types of torque controls for the transmission clutch CL1, the engine E, the rotary electric machine MG, the speed change mechanism TM, and the like, engagement controls for the friction engagement elements, and other controls. The vehicle control device 34 includes the mode control unit 46.

The mode control unit 46 is a functional portion that performs an integrated control. In this integrated control, the mode control unit 46 calculates the target driving force of the drive system 2 in accordance with the accelerator operation amount, the vehicle speed, the battery charge amount, and the like, and determines the operation mode of each drive power source, i.e., the engine E and the rotary electric machine MG. The mode control unit 46 further calculates the request torque for each drive power source, the transmission torque capacity of each clutch, and the shift speed of the speed change mechanism TM, and issues commands for these to the other functional portions.

The mode control unit 46 executes the start control of the engine E by increasing the engagement pressure of the transmission clutch CL1, and performs the rotational speed feedback control of the rotary electric machine MG when starting combustion in the engine E under a combustion-stopped vehicle running condition in which the transmission clutch CL1 is disengaged, combustion in the engine E is stopped, the speed change mechanism TM forms the one-way transmission speed, and the output shaft O rotates. In other words, the mode control unit 46 sets a value that multiplies the rotational speed of the output shaft O by the speed ratio of the one-way transmission speed as the reference rotational speed of the input member, and sets a starting rotational speed that is lower than the reference rotational speed as the target rotational speed. The mode control unit 46 then executes the rotational speed feedback control that controls the rotary electric machine MG such that the rotational speed of the input shaft I matches the target rotational speed. During execution of the rotational speed feedback control, the mode control unit 46 performs the start control that starts combustion in the engine E by increasing the engagement pressure of the transmission clutch CL1 to increase the rotational speed of the engine E.

3-4-1. Calculation of Input Shaft Request Torque

The mode control unit 46 calculates an input shaft request torque Ti. In the present embodiment, the input shaft request torque Ti is a target value of the torque transmitted from the input shaft I that is connected to the drive power source to the torque converter TC. Therefore, first, the mode control unit 46 calculates the target driving force of the drive system 2 that is output to the wheel W based on the accelerator operation amount, the vehicle speed, and the like. Next, from the target driving force of the drive system 2, the mode control unit 46 calculates an output shaft request torque that is a target value of the torque transmitted from the output shaft O to the wheel W side. From the output shaft request torque, the mode control unit 46 calculates the input shaft request torque Ti based on the speed ratio of the shift speed formed by the speed change mechanism TM, the characteristics of the transmission torque of the torque converter TC if the lock-up clutch LC is disengaged, and the like.

3-4-2. Calculation of Operation Mode

The mode control unit 46 calculates the operation mode of each drive power source based on the accelerator operation amount, the vehicle speed, the battery charge amount, and the like. In the present embodiment, the operation modes include the electric running mode in which the vehicle runs using only the rotary electric machine MG as the drive power source, and the parallel running mode in which the vehicle runs using at least the engine E as the drive power source. When the operation mode is changed from the electric running mode to the parallel running mode, a parallel running transition mode in which a control is performed to transition from the electric running mode to the parallel running mode is temporarily set as the operation mode. When the operation mode is changed from the parallel running mode to the electric running mode, an electric running transition mode in which a control is performed to transition from the parallel running mode to the electric running mode is temporarily set as the operation mode. In the present embodiment, an example is described in which the electric running mode is calculated as the operation mode if the accelerator operation amount is small and the battery charge amount is large; in all other cases, that is, if the accelerator operation amount is large and the battery charge amount is small, the parallel running mode is calculated as the operation mode. Note that if the vehicle speed is zero with the vehicle stopped and no acceleration request from the driver such as a minimum accelerator operation amount, a stationary vehicle mode is set as the operation mode and the mode control unit 46 performs a control that follows a stationary vehicle control sequence.

3-4-3. Calculation of Request Torque

The mode control unit 46 calculates the engine request torque Te that is the target value of the output torque of the engine E, the request transmission torque capacity Tk that is the target value of the transmission torque capacity of the transmission clutch CL1, and the motor request torque Tm that is the target value of the output torque of the rotary electric machine MG, in accordance with the operation modes. The mode control unit 46 also sets the target combustion state of the engine E in accordance with the operation modes. A summary of each operation mode is given below.

3-4-3-1. Electric Running Mode

If the electric running mode is determined as the operation mode, the engine request torque Te and the request transmission torque capacity Tk of the transmission clutch CL1 are set to zero, and the motor request torque Tm is set to a value that corresponds to the input shaft request torque Ti. The mode control unit 46 sets the target combustion state of the engine E to a non-combustion state that is a condition in which combustion is stopped.

3-4-3-2. Parallel Running Mode

If the parallel running mode is determined as the operation mode, the mode control unit 46 sets the request transmission torque capacity Tk to the transmission torque capacity at which the transmission clutch CL1 is fully engaged, and sets the engine request torque Te and the motor request torque Tm such that the sum total of the engine request torque Te and the motor request torque Tm is equal to the input shaft request torque Ti. Here, "fully engaged" refers to an engagement state in which there is no rotational speed difference (slip) between the input and output members of the friction engagement element. The mode control unit 46 sets the target combustion state of the engine E to a combustion state.

3-4-3-3. Parallel Running Transition Mode

If the parallel running transition mode is determined as the operation mode, the mode control unit 46 increases the engagement pressure of the transmission clutch CL1, increases the rotational speed of the engine E, sets the target combustion state of the engine E to a combustion start state that transitions the engine E from the non-combustion state to the combustion state, and starts combustion in the engine E.

In the present embodiment, the mode control unit 46 has a characteristic of performing a control for the parallel running transition mode, which is executed when transitioning to the parallel running transition running mode by lowering the battery charge amount or the like when the input shaft request torque Ti is near zero. The control for the parallel running transition mode will be described in detail later.

3-4-3-4. Electric Running Transition Mode

If the electric running transition mode is determined as the operation mode in order to transition from the parallel running mode to the electric running mode, the mode control unit 46 decreases the request transmission torque capacity Tk of the transmission clutch CL1 to zero, after which the mode control unit 46 sets the target combustion state of the engine E to a combustion stop state that transitions the engine E from the combustion state to the non-combustion state, stops combustion in the engine E, and sets the engine request torque Te to zero.

3-4-4. Control in Parallel Running Transition Mode

In the embodiment below, a control performed by the mode control unit 46 for the parallel running transition mode when the input shaft request torque Ti is near zero will be described with reference to FIGS. 6 to 8. Specifically, an example is described in which, from a state in which the electric running mode is set as the operation mode with the accelerator operation amount small and the input shaft request torque Ti set within a predetermined range near zero (up to a time t11 in FIG. 6), the parallel running transition mode is calculated as the operation mode (the time t11 in FIG. 6) by decreasing the battery charge amount to less than a predetermined determination value or the like. Note that, in the present example, the input shaft request torque Ti is set to zero.

In the electric running mode, as described above, the transmission clutch CL1 is disengaged and combustion in the engine E is stopped. In the present example, during the electric running mode, the one-way transmission speed is formed in the speed change mechanism TM and the lock-up clutch LC is engaged. In addition, the input shaft request torque Ti is set near zero, so the vehicle gradually decelerates due to running resistance. The rotational speed of the rotary electric machine MG decreases due to the one-way transmission speed in accordance with the decrease in the rotational speed of the output shaft O. The rotational speed of the rotary electric machine MG matches the reference rotational speed that is found by multiplying the rotational speed of the output shaft O by the speed ratio of the one-way transmission speed. Note that, until the time t11 is reached, the rotational speed of the rotary electric machine MG may fall below the reference rotational speed.

If the electric running mode is set as the operation mode, as described above, the mode control unit 46 sets the target combustion state of the engine E to the non-combustion state, and sets the engine request torque Te to zero. The mode control unit 46 also sets the request transmission torque capacity Tk to zero, and sets the motor request torque Tm to a value that corresponds to the input shaft request torque Ti. The mode control unit 46 then issues commands for the set request torques and the target combustion state to the control devices 31 to 33. The control devices 31 to 33 subsequently control the engine E, the rotary electric machine MG, and the transmission clutch CL1.

3-4-4-1. Start of Rotational Speed Feedback Control of Rotary Electric Machine

Figure 6:
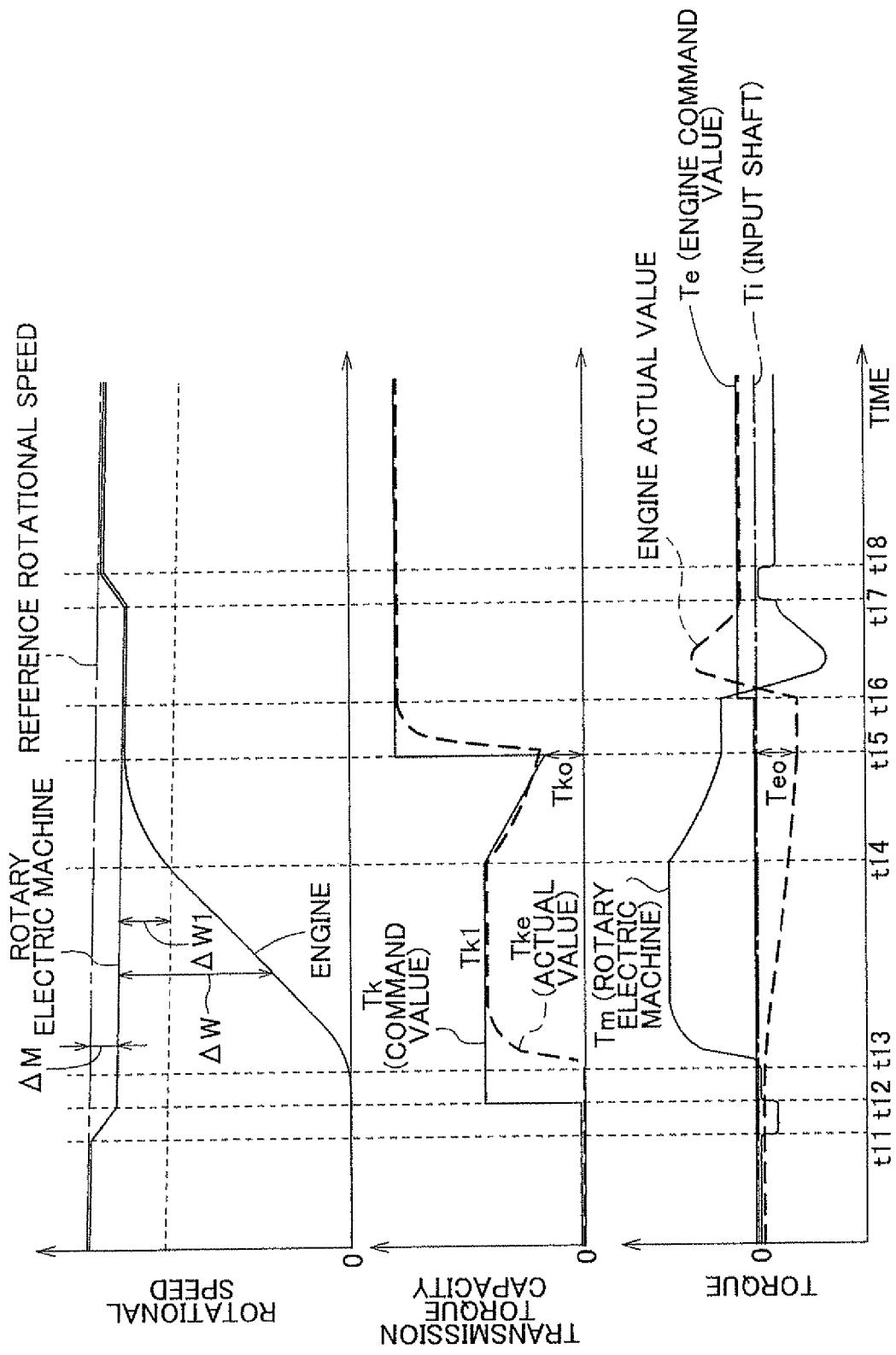
FIG. 6 is a timing chart that shows processing of the control system according to the first embodiment of the present invention.

The mode control unit 46 starts the rotational speed feedback control of the rotary electric machine MG if in a state where the input shaft request torque Ti is set within the predetermined range near zero, a determination is made to transition the operation mode from the electric running mode to the parallel running mode, that is, if the operation mode is changed to the parallel running transition mode (the time t11 in FIG. 6).

The mode control unit 46 sets a value that multiplies the rotational speed of the output shaft O by the speed ratio of the one-way transmission speed as the reference rotational speed of the input shaft I, and sets a starting rotational speed that is lower than the reference rotational speed as the target rotational speed. The mode control unit 46 then executes the rotational speed feedback control that controls the rotary electric machine MG such that the rotational speed of the input shaft I matches the target rotational speed. Specifically, the mode control unit 46 issues a command for the target rotational speed to the rotary electric machine control device 32, which executes the rotational speed feedback control that changes the output torque of the rotary electric machine MG such that the rotational speed of the input shaft I matches the target rotational speed.

In the present example, the starting rotational speed is set to a rotational speed that is lower than the reference rotational speed by a predetermined value $\Delta M$. The predetermined value $\Delta M$ will be called a "reference rotational speed difference $\Delta M$" below. Note that the reference rotational speed difference $\Delta M$ is set to a value that adds a predetermined margin to a feedback control amplitude. For example, the predetermined margin is set to approximately 10% of the feedback control amplitude. The feedback control amplitude is an amplitude of the rotational speed of the input shaft I with respect to the target rotational speed during execution of the rotational speed feedback control, and is a value that is measured in advance and set in consideration of a frequency distribution and the like. Since the reference rotational speed difference $\Delta M$ is thus set for the feedback control amplitude, a minimum reduction width is set so that the rotational speed of the input shaft I can be prevented from reaching the reference rotational speed and the torque fluctuations of the input shaft I can be prevented from reaching the output shaft O. Accordingly, it is possible to shorten a time span from the start of the rotational speed feedback control until the rotational speed of the input shaft I reaches the starting rotational speed, and a time span until the rotational speed of the input shaft I reaches the reference rotational speed from the starting rotational speed at the end of the parallel running transition mode that will be described later, and also possible to shorten the time span of the parallel running transition mode.

Note that if the one-way transmission speed is not formed in the speed change mechanism TM, the mode control unit 46 commands the speed change mechanism control unit 43 to form the one-way transmission speed in the speed change mechanism TM, and starts the rotational speed feedback control of the rotary electric machine MG after the one-way transmission speed is formed. If the first clutch C1 and the second brake B2 of the speed change mechanism TM are engaged to form a two-way shift speed that is the first speed, for example, the second brake B2 is disengaged to form the one-way transmission speed.

3-4-4-2. Increase in Rotational Speed of Engine

During execution of the rotational speed feedback control, the mode control unit 46 performs the start control that starts combustion in the engine E by increasing the engagement pressure of the transmission clutch CL1 to increase the rotational speed of the engine E. In the present embodiment, the mode control unit 46 performs a control that increases the rotational speed of the engine E to the rotational speed of the rotary electric machine MG (input shaft I) by increasing the transmission torque capacity of the transmission clutch CL1.

According to the present embodiment, once the rotational speed of the input shaft I reaches the target rotational speed (a time t12 in FIG. 6), the mode control unit 46 increases the request transmission torque capacity Tk of the transmission clutch CL1 from zero to a first target value Tk1. The mode control unit 46 issues a command for the set request torque transmission torque capacity Tk (=Tk 1) to the speed change mechanism control unit 43, which increases the transmission torque capacity of the transmission clutch CL1 to the command value. As described above, there is a follow-up delay in the change of the actual transmission torque capacity with respect to the change of the command value, and after a predetermined wasted time has elapsed (a time t13 in FIG. 6), the transmission torque capacity gradually increases to the command value with a predetermined delay in response.

The transmission clutch CL1 engages once the transmission torque capacity of the transmission clutch CL1 becomes larger than zero. The rotary electric machine MG is controlled so as to maintain the target rotational speed, and the rotation of the engine E is stopped. Consequently, there is a rotational speed difference between the input and output members of the transmission clutch CL1. If this rotational speed difference occurs, a torque of the transmission torque capacity is transmitted from the member with the higher rotational speed to the member with the lower rotational speed. Immediately after changing to the parallel running transition mode, the rotational speed of the engine output shaft Eo becomes lower than that of the input shaft I, so a torque is transmitted from the input shaft I to the engine output shaft Eo, that is, from the rotary electric machine MG to the engine E. Thus, the engine E is input with a torque corresponding to the transmission torque capacity of the transmission clutch CL1. The rotational speed of the engine E subsequently increases at a predetermined rate of acceleration. Here, the predetermined rate of acceleration is a value that divides a torque that adds together the torque transmission capacity and the output torque of the engine E by an inertial moment of the engine E or the like. Over a predetermined time span after changing to the parallel running transition mode, the request transmission torque capacity Tk is set to the predetermined constant value Tk1, and the output torque of the engine E in the non-combustion state is a negative torque whose magnitude is relatively smaller than that generated from friction, pumping, and the like. Therefore, the rotational speed of the engine E increases at a roughly constant rate of acceleration.

3-4-4-3. Synchronization of Rotational Speed of Engine and Rotational Speed of Rotary Electric Machine The mode control unit 46 performs a control that, after a rotational speed difference $\Delta W$ that is the difference between the rotational speed of the engine E and the rotational speed of the rotary electric machine MG becomes equal to or less than a predetermined value $\Delta W1$, synchronizes the rotational speed of the engine E and the rotational speed of the rotary electric machine while decreasing the transmission torque capacity of the transmission clutch CL1.

At such time, in the present embodiment, the mode control unit 46 performs a control that matches the transmission torque capacity of the transmission clutch CL1 when the rotational speed of the engine E and the rotational speed of the rotary electric machine MG are synchronized with the magnitude of the output torque of the engine E before combustion is started. Here, the output torque of the engine E before combustion is started is a negative torque, and the engine E is driven by the torque transmitted from the rotary electric machine MG side through the transmission clutch CL1.

Specifically, after the rotational speed of the engine E increases and the rotational speed difference ΔW between the engine E and the rotary electric machine MG becomes equal to or less than the predetermined first determination value ΔW1 (a time t14 in FIG. 6), the mode control unit 46 decreases the request transmission torque capacity Tk to a second target value Tko in accordance with the decrease in the rotational speed difference ΔW between the engine E and the rotary electric machine MG. Note that the second target value Tko is set so as to match the magnitude of an output torque Teo of the engine E, as will be described later.

According to the present embodiment, the mode control unit 46 uses a feedback control that corresponds to the rotational speed difference ΔW between the engine E and the rotary electric machine MG to set the request transmission torque capacity Tk. In the present example, the mode control unit 46 sets the request transmission torque capacity Tk in accordance with Equation (1) below.

$$Tk = Kp \times \Delta W + \int (Ki \times \Delta W) dt + Tko \quad (1)$$

Here, the first term on the right side of Equation (1) is a proportional term, the second term is an integral term, and the third term is an offset term. ΔW is a rotational speed difference that subtracts the rotational speed of the engine E from the rotational speed of the rotary electric machine MG. Kp is a proportional gain, Ki is an integral gain, Tko is an offset, and Tko is set so as to match the output torque Teo of the engine E. Tko may be set to a preset fixed value, or set to the magnitude of the output torque of the engine E that is estimated by the engine control unit 41. For example, the engine control unit 41 may calculate a negative torque based on the detected rotational speed of the engine E and throttle opening, and a preset map of negative torques output by the engine E in accordance with the rotational speed of the engine E and the throttle opening, and set this torque as the output torque. In addition, the proportional gain Kp and the integral gain Ki are set such that the rotational speed of the engine E does not overshoot the rotational speed of the rotary electric machine MG.

With the configuration described above, a rate of change (acceleration) of the rotational speed difference ΔW can approach zero when the rotational speed of the engine E first matches the rotational speed of the rotary electric machine MG. However, in the present embodiment, the input shaft request torque Ti is set near zero and the vehicle is in a state of gradual deceleration due to running resistance. Therefore, the rotational speed of the output shaft O has a small rate of decrease and the rotational speed of the rotary electric machine MG also has a small rate of decrease. Thus, the rate of acceleration of the rotational speed difference ΔW is roughly equal to the rate of acceleration of the rotational speed of the engine E. Further, the rate of acceleration at which the rotational speed of the engine E increases is proportional to a torque that sums the transmission torque capacity of the transmission clutch CL1 and the output torque of the engine E. Accordingly, when the rate of acceleration of the rotational speed difference ΔW approaches zero, the transmission torque capacity of the transmission clutch CL1 approaches the magnitude of the output torque of the engine E.

Before synchronization of the rotational speeds of the engine E and the rotary electric machine MG and while there is still a rotational speed difference between the input and output members of the transmission clutch CL1, a torque of the magnitude of the transmission torque capacity is transmitted from the rotary electric machine MG side to the engine E side through the transmission clutch CL1. Following synchronization of the rotational speeds, a torque of the magnitude of the negative torque output from the engine E is transmitted from the rotary electric machine MG side to the engine E side through the transmission clutch CL1. Before and after synchronization of the rotational speeds, the torque transmitted by the transmission clutch CL1 switches from a torque of the magnitude of the transmission torque capacity to a torque of the magnitude of the negative torque of the engine E. Therefore, torque shock may occur. However, even if torque shock occurs, the transmission of torque from the input shaft I to the output shaft O is cut off because the one-way transmission speed is formed in the speed change mechanism TM and the rotational speed of the input shaft I is controlled to the starting rotational speed.

Also, as described above, the magnitude of the transmission torque capacity and the magnitude of the negative torque of the engine E are controlled so as to correspond to one another. Therefore, it is possible to ensure that the torque transmitted between the engine E and the rotary electric machine MG does not cause torque shock at the moment of synchronization. Thus, a drop in the control accuracy of the rotational speed feedback control due to the generation of torque shock at the moment of synchronization can be suppressed. Since the feedback control amplitude can be decreased accordingly, the rotational speed of the input shaft I can be prevented from reaching the reference rotational speed and the torque fluctuations of the input shaft I can be prevented from reaching the output shaft O. It is also possible to decrease the magnitude of the reference rotational speed difference ΔM.

Next, the motor request torque Tm of the rotary electric machine MG, which is set by the rotary electric machine control device 32, over a period spanning from the start of the increase in the engagement pressure of the transmission clutch CL1 to synchronization of the rotational speeds (from a time t13 in FIG. 6 to a time t15 in FIG. 6) will be described. With the transmission clutch CL1 in which there is a rotational speed difference engaged, a torque corresponding to the transmission torque capacity of the transmission clutch CL1 is transmitted from the rotary electric machine MG to the engine E. Accordingly, the torque acting on the input shaft I is decreased by an amount corresponding to the transmission torque capacity of the transmission clutch CL1. Thus, in order to maintain the rotational speed of the input shaft I at the target rotational speed, the rotary electric machine control device 32 through the feedback control automatically increases the motor request torque Tm by an amount that corresponds to the transmission torque capacity of the transmission clutch CL1. Here, in addition to the feedback control, the rotary electric machine control device 32 may increase the motor request torque Tm in a feedforward manner by an amount that corresponds to an estimated transmission torque capacity of the transmission clutch CL1. In this case, the estimated value of the transmission torque capacity is set to a value found by performing processing of a delay such as a wasted time delay or a primary delay with respect to the request transmission torque capacity Tk. Alternatively, the estimated value of the transmission torque capacity may be set to a value found by estimating the behavior of the hydraulic pressure supplied to the transmission clutch CL1 and estimating the transmission torque capacity from the estimated value of the hydraulic pressure. By thus performing a feedforward control as well, the control accuracy of the rotational speed feedback control can be improved. Since the feedback control amplitude can be decreased accordingly, the rotational speed of the input shaft I can be prevented from reaching the reference rotational speed and the torque fluctuations of the input shaft I can be prevented from reaching the output shaft O. It is also possible to decrease the magnitude of the reference rotational speed difference $\Delta M$.

3-4-4-4. Full Engagement of Transmission Clutch CL1

The mode control unit 46 performs a control that increases the transmission torque capacity of the transmission clutch CL1, after the rotational speed of the engine E and the rotational speed of the rotary electric machine MG are synchronized but before combustion in the engine E is started, to equal to or greater than the magnitude of the torque output from the engine E after the start of combustion in the engine E.

First, the mode control unit 46 performs a synchronization determination that determines whether the rotational speed of the engine E and the rotational speed of the rotary electric machine MG are synchronized. The mode control unit 46 determines that the rotational speeds are synchronized if the rotational speed difference $\Delta W$ and the rate of acceleration of the rotational speed difference $\Delta W$ are sufficiently small. In the present embodiment, if the rotational speed difference $\Delta W$ is equal to or less than a predetermined value and the rate of acceleration of the rotational speed difference $\Delta W$ is equal to or less than a predetermined value (the time t15 in FIG. 6), the rotational speeds are determined to be synchronized.

If the rotational speeds are determined to be synchronized, the mode control unit 46 then increases the request transmission torque capacity Tk of the transmission clutch CL1 to a full engagement capacity. In the present embodiment, the full engagement capacity is set larger than the maximum torque that can be output by the engine E. For example, the full engagement capacity is set to a value that multiplies the maximum output torque of the engine E by a predetermined factor of safety.

3-4-4-5. Start of Engine Combustion

In the present embodiment, if the actual transmission torque capacity reaches the increased request transmission torque capacity Tk, the mode control unit 46 determines that engagement of the transmission clutch CL1 is complete and subsequently starts combustion in the engine E. More specifically, if the difference between the increased request transmission torque capacity Tk and an estimated transmission torque capacity Tke is equal to or less than a predetermined value (a time t16 in FIG. 6), the mode control unit 46 determines that engagement of the transmission clutch CL1 is complete. Alternatively, it may be determined that engagement of the transmission clutch CL1 is complete after the elapse of a predetermined time since increasing the request transmission torque capacity Tk of the transmission clutch CL1 to the full engagement capacity. The mode control unit 46 issues a command to the engine control unit 41 to start combustion in the engine E. As described above, the engine control unit 41 starts a supply of fuel to the engine E through the fuel supply device 35, and ignites the fuel supplied to the engine E through the ignition coil 36.

Additionally, if the mode control unit 46 determines that engagement of the transmission clutch CL1 is complete, the mode control unit 46 sets the engine request torque Te in accordance with a method for setting the engine request torque Te following a transition to the parallel running mode. In the example shown in FIG. 6, the engine request torque Te is set to a predetermined positive torque and a rotary driving force for power generation is supplied to the rotary electric machine MG. Immediately after combustion in the engine E is started, a torque increase accompanies the start of combustion, and the actual output torque of the engine E temporarily overshoots the engine request torque Te. Through the rotational speed feedback control, the rotary electric machine MG automatically generates a positive or negative output torque that is the reverse of the output torque of the engine E so as to cancel out the output torque of the engine E. In the present example, the rotary electric machine MG generates a negative torque through power generation. Note that the rotary electric machine control device 32 may, in addition to feedback, estimate the output torque of the engine E based on a fuel injection amount or the like and change the output torque of the rotary electric machine MG in a feedforward manner. Since the control accuracy of the rotational speed feedback control can be improved accordingly with the configuration described above, the rotational speed of the input shaft I can be prevented from reaching the reference rotational speed and the torque fluctuations of the input shaft I can be prevented from reaching the output shaft O. It is also possible to decrease the magnitude of the reference rotational speed difference $\Delta M$.

If the output torque of the rotary electric machine MG approaches a torque that corresponds to the engine request torque Te but has the opposite positive or negative sign, or if the estimated output torque of the engine E approaches the engine request torque Te, or if a predetermined time after the start of combustion in the engine E has elapsed (a time t17 in FIG. 6), the mode control unit 46 determines that the torque replacement between the rotary electric machine MG and the engine E is complete and ends the start control of the engine E.

During the start control of the engine E described above, the transmission of torque from the input shaft I to the output shaft O is cut off because the one-way transmission speed is formed in the speed change mechanism TM and the rotational speed of the input shaft I is maintained at the starting rotational speed through the rotational speed feedback control of the rotary electric machine MG. Thus, even if the torque transmitted to the input shaft I due to engagement of the transmission clutch CL1 and starting of the engine E generates torque shock, it is possible to prevent the transmission of the torque shock to the wheel W.

3-4-4-6. Synchronization of Input Shaft with Reference Rotational Speed

After combustion in the engine E is started and engagement of the transmission clutch CL1 is complete (the time t17 in FIG. 6), the mode control unit 46 changes and sets the target rotational speed to a rotational speed that matches the reference rotational speed, and continues to execute the rotational speed feedback control through the rotary electric machine control device 32. Note that the target rotational speed may be gradually increased from the starting rotational speed to the reference rotational speed. Alternatively, the output torque of the rotary electric machine MG may be controlled such that the rate of acceleration of the rotational speed of the input shaft I decreases as the rotational speed of the input shaft I approaches the reference rotational speed. Thus, the rate of acceleration of the rotational speed of the input shaft I at the moment the rotational speed of the input shaft I reaches the reference rotational speed can be reduced. Consequently, the torque transmitted from the input shaft I to the output shaft O through the one-way transmission speed can be reduced at the moment the reference rotational speed is reached and the generation of torque shock can be suppressed.

In addition, the reference rotational speed difference ΔM is set to a minimum required lower limit. Therefore, the rotational speed of the input shaft I is increased to the reference rotational speed in as short a time span as possible, which can reduce the necessity of increasing the rate of acceleration of the rotational speed of the input shaft I. It is thus possible to suppress an increase in the rate of acceleration, and also possible to suppress the generation of torque shock at the moment the rotational speed of the input shaft I reaches the reference rotational speed. At the same time, the time span until the rotational speed of the input shaft I reaches the reference rotational speed can be shortened, and the time span of the parallel running transition mode can also be shortened.

After determining that the rotational speed of the input shaft I is synchronized with the reference rotational speed, the mode control unit 46 commands the rotary electric machine MG to terminate the rotational speed feedback control. The mode control unit 46 then determines that the transition to the parallel running mode is complete, changes the operation mode from the parallel running transition mode to the parallel running mode, and ends the control for the parallel running transition mode. The mode control unit 46 subsequently sets the motor request torque Tm such that the sum value of the engine request torque Te and the motor request torque Tm corresponds to the input shaft request torque Ti.

3-44-7. Control Processing Procedure for Parallel Running Transition Mode

Next, control processing for the parallel running transition mode according to the present embodiment will be described with reference to FIGS. 7 and 8. The processing procedure described below is executed by the functional portions of the control system 1.

Figure 7:
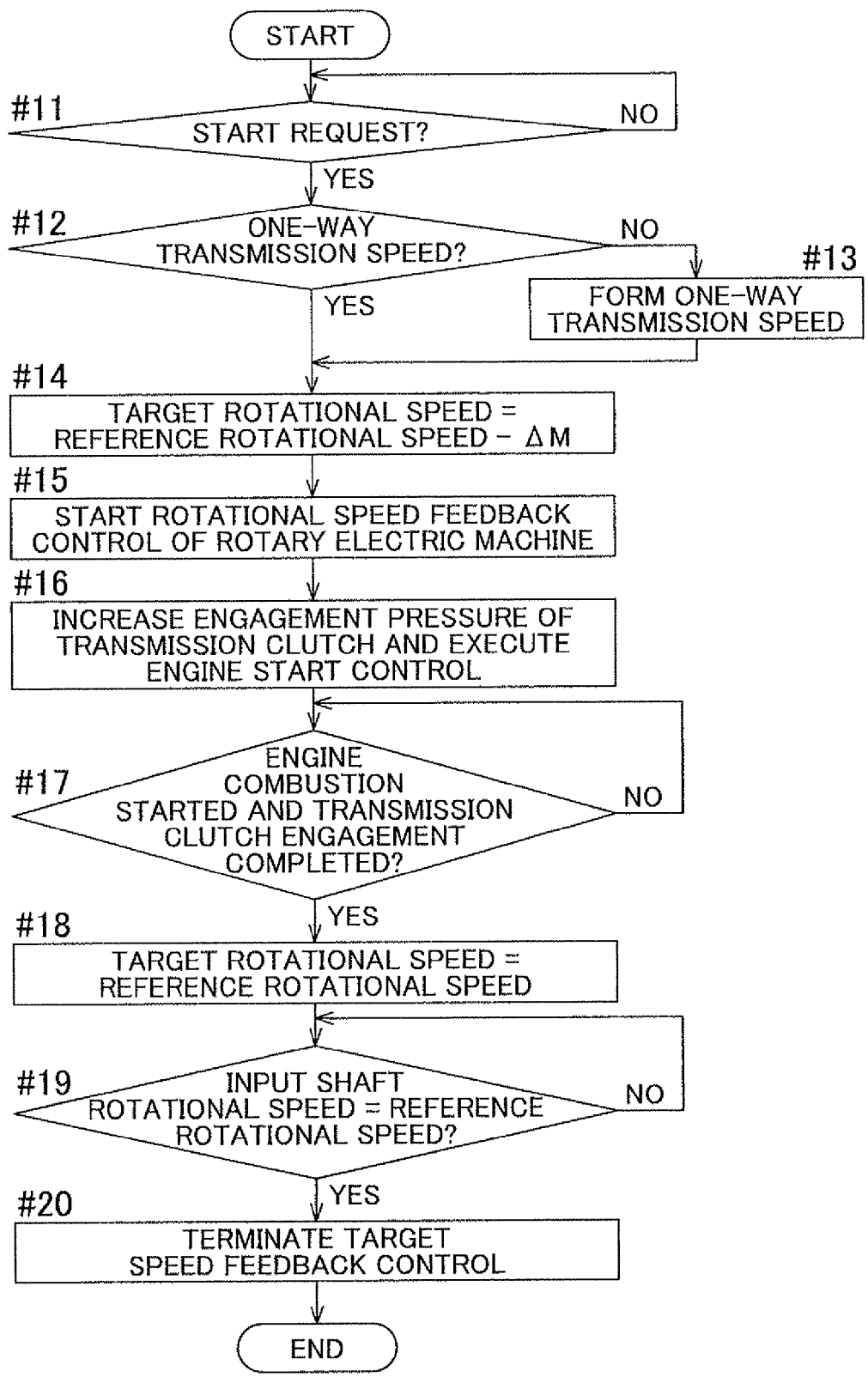
FIG. 7 is a flowchart that shows processing of the control system according to the first embodiment of the present invention.
Figure 8:
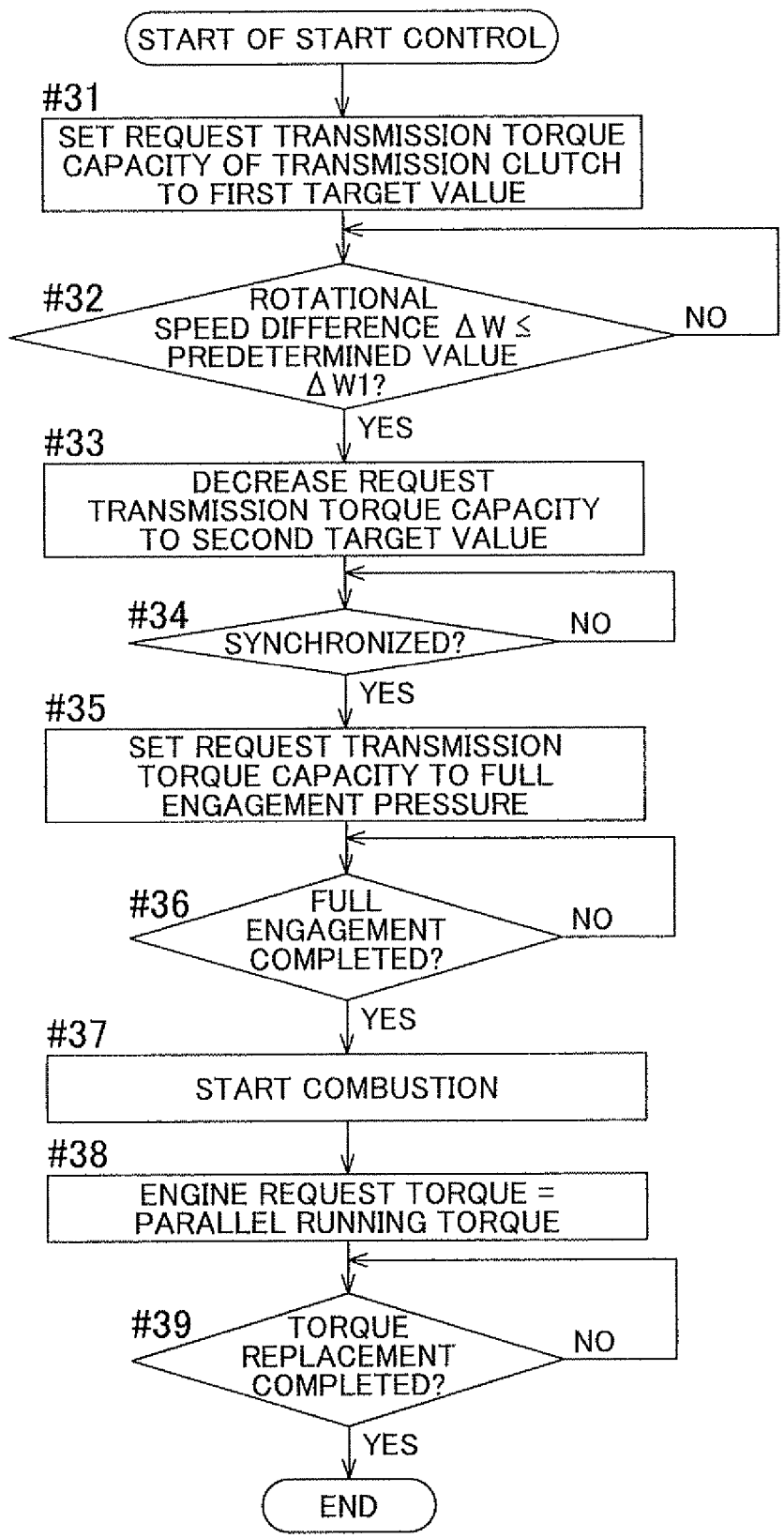
FIG. 8 is a flowchart that shows processing of the control system according to the first embodiment of the present invention.

FIG. 7 is a flowchart that shows an overall processing procedure of the control for the parallel running transition mode. FIG. 8 is a flowchart that shows in detail processing for the control that engages the transmission clutch CL1 and the control that starts combustion in the engine E, which corresponds to the processing at step #16 among the processing in FIG. 7. Note that, in the following description, in an initial state the vehicle is traveling in the electric running mode with the input shaft request torque Ti set near zero.

Here, the flowchart shown in FIG. 7 will be explained. First, the mode control unit 46 performs processing that determines the operation mode as described above. If the mode control unit 46 determines that there is a request to start the engine E and changes the operation mode to the parallel running transition mode (step #11: Yes), and as described above, if the mode control unit 46 determines that the one-way transmission speed is not formed in the speed change mechanism TM (step #12: No), the mode control unit 46 performs processing to form the one-way transmission speed (step #13). The mode control unit 46 then performs the following control to start combustion in the engine E under a combustion-stopped vehicle running condition in which the transmission clutch CL1 is disengaged, combustion in the engine E is stopped, the speed change mechanism TM forms the one-way transmission speed, and the output shaft O rotates.

As described above, the mode control unit 46 performs processing that sets the starting rotational speed, which is lower than the reference rotational speed that is calculated by multiplying the rotational speed of the output shaft O by the speed ratio of the one-way transmission speed, as the target rotational speed (step #14). The mode control unit 46 next performs processing that executes the rotational speed feedback control through the rotary electric machine control device 32 to control the rotary electric machine MG such that the rotational speed of the input shaft I matches the target rotational speed (step #15). Thus, a state is achieved in which the torque fluctuations of the input shaft I caused by starting the engine E are not transmitted to the output shaft O. During execution of the rotational speed feedback control, the mode control unit 46 performs the start control that starts combustion in the engine E by increasing the engagement pressure of the transmission clutch CL1 to increase the rotational speed of the engine E (step #16). Note that this processing at step #16 will be described in detail later using FIG. 8. After combustion in the engine E is started and engagement of the transmission clutch CL1 is complete (step #17: Yes), the mode control unit 46 performs processing that changes and sets the target rotational speed to a rotational speed that matches the reference rotational speed (step #18), and continues to execute the rotational speed feedback control. Thereafter, if the rotational speed of the input shaft I is synchronized with the reference rotational speed (step #19: Yes), the mode control unit 46 performs processing that terminates the rotational speed feedback control (step #20). The mode control unit 46 then changes the operation mode from the parallel running transition mode to the parallel running mode, and ends the control for the parallel running transition mode.

Next, the flowchart in FIG. 8 that shows the processing at step #16 in FIG. 7 in detail will be explained. First, as described above, the mode control unit 46 performs processing that sets the request transmission torque capacity of the transmission clutch CL1 to the first target value (step #31), and increases the engagement pressure of the transmission clutch CL1 to increase the rotational speed of the engine E. If the rotational speed difference ΔW that is the difference between the rotational speeds of the engine E and the rotary electric machine MG is equal to or less than the predetermined value ΔW1 (step #32: Yes), as described above, the mode control unit 46 performs processing that decreases the request torque capacity to the second target value in accordance with the decrease in the rotational speed difference ΔW. If the mode control unit 46 determines that the rotational speeds of the engine E and the rotary electric machine MG are synchronized (step #34: Yes), the mode control unit 46 performs processing that sets the request transmission torque capacity of the transmission clutch CL1 to the full engagement pressure (step #35). If the mode control unit 46 determines that the transmission clutch CL1 is fully engaged (step #36: Yes), the mode control unit 46 performs processing that starts combustion in the engine E. At the same time, the mode control unit 46 performs processing that sets the engine request torque Te to a torque set in the parallel running mode (step #38). If the mode control unit 46 determines that the torque replacement between the rotary electric machine MG and the engine E is complete (step #39: Yes), the mode control unit 46 ends the start control of the engine E.

4. Second Embodiment

Figure 9:
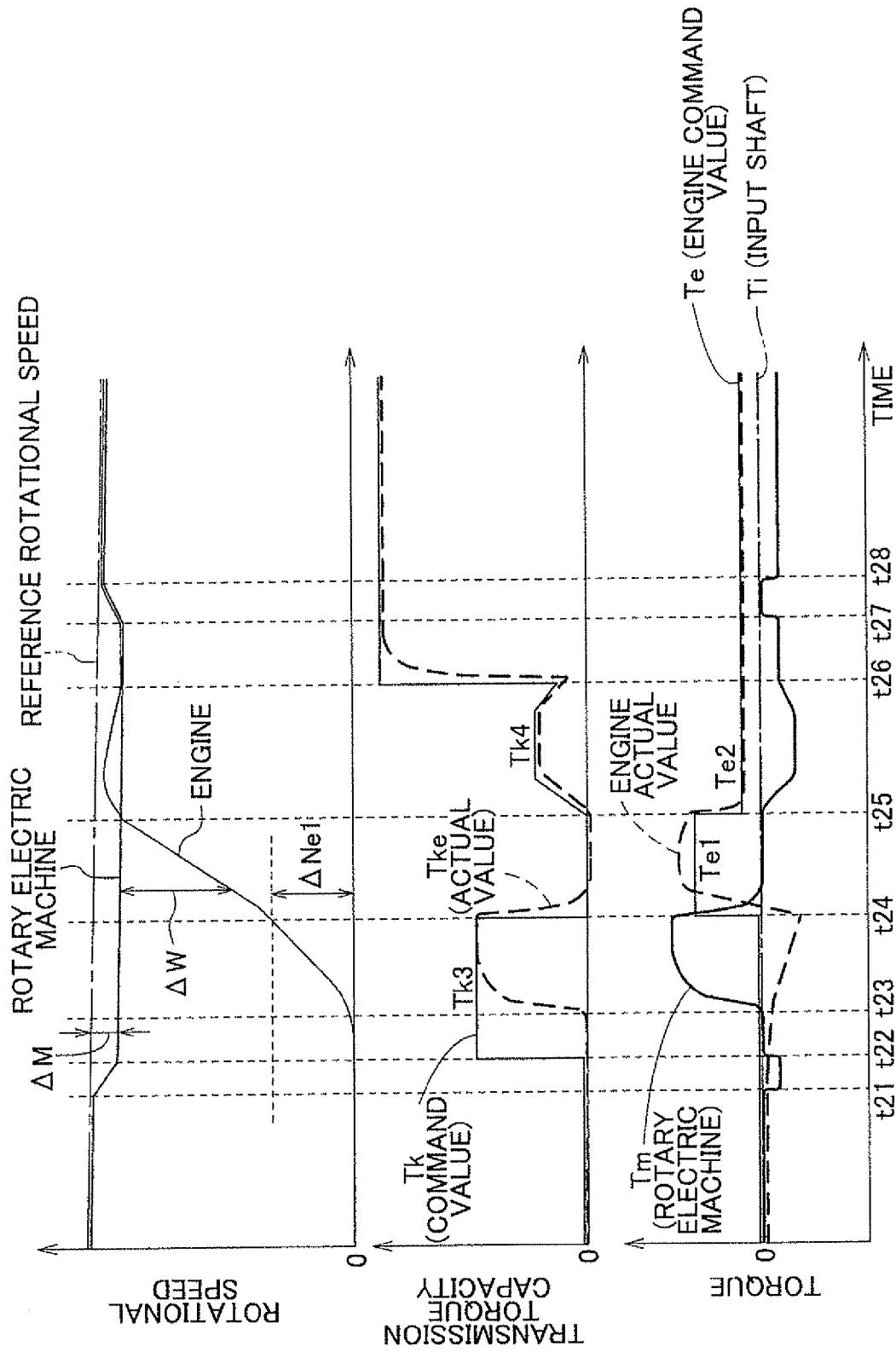
FIG. 9 is a timing chart that shows processing of the control system according to a second embodiment of the present invention.
Figure 10:
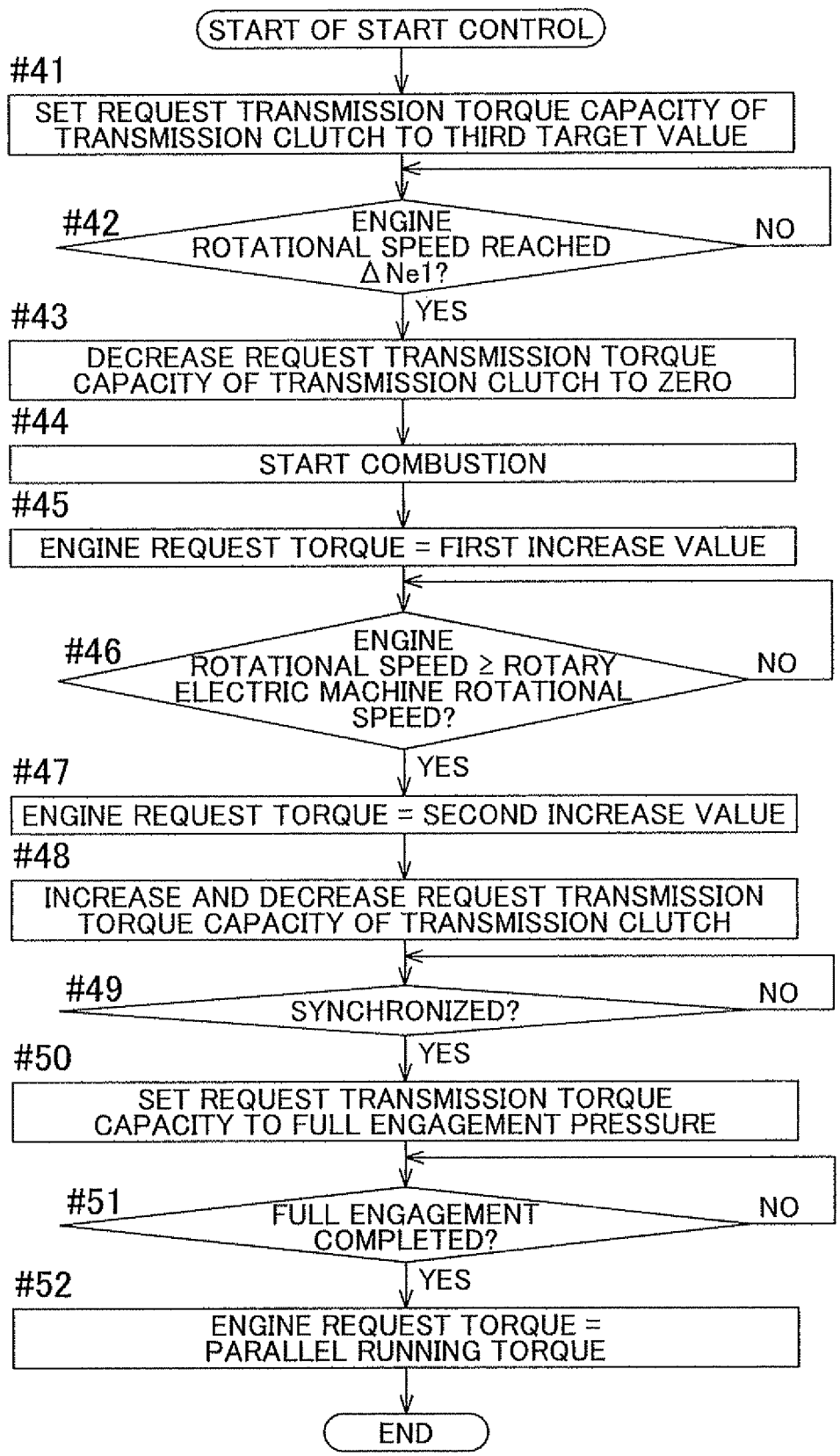
FIG. 10 is a flowchart that shows processing of the control system according to the second embodiment of the present invention.

A second embodiment of the control system 1 according to the present invention will be described with reference to the drawings. FIGS. 9 and 10 are drawings that show a control of the mode control unit 46 according to the present embodiment. The mode control unit 46 according to the present embodiment differs from the first embodiment with respect to the content of the start control that starts combustion in the engine E by increasing the engagement pressure of the transmission clutch CL1. Otherwise, the constitution of the second embodiment is basically identical to that of the first embodiment. The following description will focus on points where the start control according to the present embodiment differs from that of the first embodiment. Note that aspects not described in particular detail are similar to those of the first embodiment.

4-1. Increase in Rotational Speed of Engine

During execution of the rotational speed feedback control, the mode control unit 46 performs the start control that starts combustion in the engine E by increasing the engagement pressure of the transmission clutch CL1 to increase the rotational speed of the engine E. In the present embodiment, the mode control unit 46 performs a control that increases the rotational speed of the engine E to ΔNe1, which is a rotational speed that is lower than the rotational speed of the rotary electric machine MG, by increasing the transmission torque capacity of the transmission clutch CL1.

Similar to the first embodiment, if the rotational speed of the input shaft I reaches the target rotational speed (a time t22 in FIG. 9), the mode control unit 46 increases the request transmission torque capacity Tk of the transmission clutch CL1 from zero to a third target value Tk3. After a predetermined wasted time has elapsed (a time t23 in FIG. 9), the actual transmission torque capacity gradually increases to the request transmission torque capacity Tk with a predetermined delay in response. When the transmission torque capacity of the transmission clutch CL1 becomes larger than zero, as described above, a torque of the magnitude of the transmission torque capacity is transmitted from the input shaft I to the engine E, and the rotational speed of the engine E increases.

At such time, in order to maintain the rotational speed of the input shaft I at the target rotational speed, as described above, the rotary electric machine control device 32 through the feedback control automatically increases the motor request torque Tm by an amount that corresponds to the transmission torque capacity of the transmission clutch CL1 (a time t23 in FIG. 9). Here, the rotary electric machine control device 32 may perform a feedforward control using an estimated transmission torque capacity as described above.

4-2. Start of Engine Combustion

If the rotational speed of the engine E increases to ΔNe1 (a time t24 in FIG. 9), the mode control unit 46 decreases the request transmission torque capacity Tk of the transmission clutch CL1 from the third target value Tk3 to zero. The mode control unit 46 issues a command to the engine control unit 41 as described above to start combustion in the engine E (the time t24 in FIG. 9). In addition, in order to increase the rotational speed of the engine E to the rotational speed of the rotary electric machine MG, the mode control unit 46 increases the engine request torque Te of the engine E from zero to a first increase value Te1 (the time t24 in FIG. 9).

4-3. Synchronization of Rotational Speeds of Engine and Rotary Electric Machine

If the rotational speed of the engine E reaches the rotational speed of the rotary electric machine MG (input shaft I) (a time t25 in FIG. 9), the mode control unit 46 decreases the engine request torque Te of the engine E from the first increase value Te1 to a second increase value Te2 that is smaller than the first increase value Te1. Since the output torque of the engine E decreases, the speed at which the rotational speed of the engine E increases is also decreased. The mode control unit 46 then progressively increases the request transmission torque capacity Tk of the transmission clutch CL1 from zero to a fourth target value Tk4 (the time t25 onward in FIG. 9). Here, the magnitude of the fourth target value Tk4 for the transmission clutch CL1 is set larger than the magnitude of the second increase value Te2 for the engine E. When the transmission torque capacity of the transmission clutch CL1 becomes larger than zero, a torque of the magnitude of the transmission torque capacity is transmitted from the engine E to the input shaft I, and an increase in the rotational speed of the engine E is suppressed. In other words, the torque relating to the increase and decrease of the rotational speed of the engine E is a torque that subtracts the torque of the magnitude of the transmission torque capacity from the output torque of the engine E. Note that, because the rotational speed of the engine E exceeds the rotational speed of the input shaft I, the direction of torque transmission in the transmission clutch CL1 is the reverse of the direction of torque transmission from the time t23 to t24, and torque is transmitted from the engine E to the input shaft I.

After the rotational speed of the engine E reaches the rotational speed of the input shaft I (the time t25 in FIG. 9), the output torque of the engine E exceeds the torque of the magnitude of the transmission torque capacity that is transmitted by the transmission clutch CL1 for some time, so the rotational speed of the engine E continues to increase. Once the torque of the magnitude of the transmission torque capacity exceeds the output torque of the engine E, the rotational speed of the engine E starts to decrease.

After the difference in the rotational speeds of the engine E and the rotary electric machine MG becomes equal to or less than a predetermined value, a control is performed in accordance with the decrease in the rotational speed difference that synchronizes the rotational speed of the engine E and the rotational speed of the rotary electric machine MG while decreasing the request transmission torque capacity Tk of the transmission clutch CL1 from the fourth target value Tk4. By thus decreasing the transmission torque capacity, it is possible to reduce the torque shock generated by torque transmitted by the transmission clutch at the moment of synchronization (a time t26 in FIG. 9). Thus, a drop in the control accuracy of the rotational speed feedback control due to the generation of torque shock at the moment of synchronization can be suppressed. Since the feedback control amplitude can be decreased accordingly, the rotational speed of the input shaft I can be prevented from reaching the reference rotational speed and the torque fluctuations of the input shaft I can be prevented from reaching the output shaft O. It is also possible to decrease the magnitude of the reference rotational speed difference ΔM.

Next, the behavior of the motor request torque Tm of the rotary electric machine MG from the time t25 to t26 in FIG. 9 will be described. The transmission torque capacity of the transmission clutch CL1 is again increased. Therefore, in order to maintain the rotational speed of the input shaft I at the target rotational speed, the rotary electric machine control device 32 through the feedback control automatically decreases the motor request torque Tm by an amount that corresponds to the transmission torque capacity of the transmission clutch CL1. Here, because the direction of torque transmission in the transmission clutch CL1 is the reverse of the direction of torque transmission from the time t23 to t24, the motor request torque Tm becomes a negative torque in the opposite direction of the positive torque from the time t23 to t24.

4-4. Full Engagement of Transmission Clutch CL1

Similar to the first embodiment, the mode control unit 46 performs a control that increases the transmission torque capacity of the transmission clutch CL1, after the rotational speed of the engine E and the rotational speed of the rotary electric machine MG are synchronized (the time t26 in FIG. 9), to equal to or greater than the magnitude of the torque output from the engine E.

The mode control unit 46 performs a synchronization determination that determines whether the rotational speed of the engine E and the rotational speed of the rotary electric machine MG are synchronized. The mode control unit 46 determines that the rotational speeds are synchronized if the rotational speed difference ΔW and the rate of acceleration of the rotational speed difference ΔW are sufficiently small (the time t26 in FIG. 9). If the rotational speeds are determined to be synchronized, the mode control unit 46 then increases the request transmission torque capacity Tk of the transmission clutch CL1 to a full engagement capacity.

In the present embodiment, similar to the first embodiment, if the actual transmission torque capacity reaches the increased request transmission torque capacity Tk (a time t27 in FIG. 9), the mode control unit 46 determines that engagement of the transmission clutch CL1 is complete. More specifically, if the difference between the increased request transmission torque capacity Tk and the estimated transmission torque capacity Tke is equal to or less than the predetermined value, or if a predetermined time has elapsed, the mode control unit 46 determines that engagement of the transmission clutch CL1 is complete.

4-5. Synchronization of Input Shaft with Reference Rotational Speed

If the mode control unit 46 determines that engagement of the transmission clutch CL1 is complete (the time t27 in FIG. 9), similar to the first embodiment, the mode control unit 46 changes and sets the target rotational speed to a rotational speed that matches the reference rotational speed, and continues to execute the rotational speed feedback control through the rotary electric machine control device 32. Additionally, similar to the first embodiment, if the mode control unit 46 determines that engagement of the transmission clutch CL1 is complete (the time t27 in FIG. 9), the mode control unit 46 sets the engine request torque Te in accordance with a method for setting the engine request torque Te following a transition to the parallel running mode. In the example shown in FIG. 9, the engine request torque Te is set to a predetermined positive torque and a rotary driving force for power generation is supplied to the rotary electric machine MG.

After determining that the rotational speed of the input shaft I is synchronized with the reference rotational speed (a time t28 in FIG. 9), the mode control unit 46 commands the rotary electric machine MG to terminate the rotational speed feedback control. The mode control unit 46 then determines that the transition to the parallel running mode is complete, changes the operation mode from the parallel running transition mode to the parallel running mode, and ends the control for the parallel running transition mode. The mode control unit 46 subsequently sets the motor request torque Tm such that the sum value of the engine request torque Te and the motor request torque Tm corresponds to the input shaft request torque Ti.

4-6. Control Processing Procedure in Parallel Running Transition Mode

Next, processing for the control that engages the transmission clutch CL1 and the control that starts combustion in the engine E, which corresponds to the processing at step #16 in FIG. 7 will be described with reference to the flowchart in FIG. 10. Note that other control processing in the parallel running transition mode, that is, the control processing in FIG. 7 that is described in the first embodiment, is identical to that in the first embodiment and will not be further described here.

First, as described above, the mode control unit 46 performs processing that sets the request transmission torque capacity of the transmission clutch CL1 to the third target value Tk3 (step #41), and increases the engagement pressure of the transmission clutch CL1 to increase the rotational speed of the engine E. If the rotational speed of the engine E reaches ΔNe1 (step #42: Yes), the mode control unit 46 performs processing that sets the request transmission torque capacity of the transmission clutch CL1 to zero (step #43). The mode control unit 46 then performs processing that starts combustion in the engine E (step #44). Next, the mode control unit 46 performs processing that increases the engine request torque Te to the first increase value Te1 (step #45). If the rotational speed of the engine E reaches the rotational speed of the rotary electric machine MG (step #46: Yes), the mode control unit 46 performs processing that decreases the engine request torque Te to the second increase value Te1 that is smaller than the first increase value Te1 (step #47). Next, as described above, the mode control unit 46 performs processing that, after increasing the transmission torque capacity of the transmission clutch CL1 to the fourth target value Tk4, decreases the transmission torque capacity to synchronize the rotational speeds of the engine E and the rotary electric machine MG (step #48). If the mode control unit 46 determines that the rotational speeds of the engine E and the rotary electric machine MG are synchronized (step #49: Yes), the mode control unit 46 performs processing that sets the request transmission torque capacity of the transmission clutch CL1 to the full engagement pressure (step #50). If the mode control unit 46 determines that the transmission clutch CL1 is fully engaged (step #51: Yes), the mode control unit 46 performs processing that sets the engine request torque Te to a torque set in the parallel running mode (step #52), and ends the start control of the engine E.

[Other Embodiments]

(1) In the embodiments described above, as an example, the first speed that is the shift speed with the largest speed ratio (reduction ratio) is set as the one-way transmission speed. However, the embodiments of the present invention are not limited to this example. Another preferred embodiment of the present invention has a constitution in which a shift speed other than the first speed, for example, the second speed that is the shift speed having the second largest speed ratio (reduction ratio), is set as the one-way transmission speed. In such case, the first embodiment described above may have a constitution in which the one-way brake F serving as the one-way clutch is arranged in series with the first brake B1 so that the first sun gear S2 of the second planetary gear device P2 is engaged only at times of negative rotation, and the first sun gear S2 can be stopped by selective fixing to the case CS. In this case, the first speed can be achieved through engagement of the first clutch C1 in cooperation with engagement of the second brake B2, and the second speed can be achieved through engagement of the first clutch C1 in cooperation with the one-way brake F.

(2) In the embodiments described above, as an example, the speed change mechanism TM is constituted by combining the single pinion type first planetary gear device P1 that has three rotation elements, and the Ravigneaux type second planetary gear device P2 that has four rotation elements. However, the embodiments of the present invention are not limited to this example. In other words, the specific internal constitution of the speed change mechanism TM may be modified as appropriate. For example, other preferred embodiments of the present invention include configuring the speed change mechanism TM to include only the second planetary gear device P2, configuring the speed change mechanism TM by combining a double pinion type planetary gear device and the Ravigneaux type planetary gear device P2, and configuring the speed change mechanism TM by combining three or more single pinion type and/or double pinion type planetary gear devices.

(3) In the embodiments described above, as an example, the speed change mechanism TM includes six shift speeds with different speed ratios (reduction ratios). However, the embodiments of the present invention are not limited to this example. In another preferred embodiment of the present invention, the speed change mechanism TM includes any number of shift speeds so long as at least one or more is a one-way transmission speed.

Figure 11:
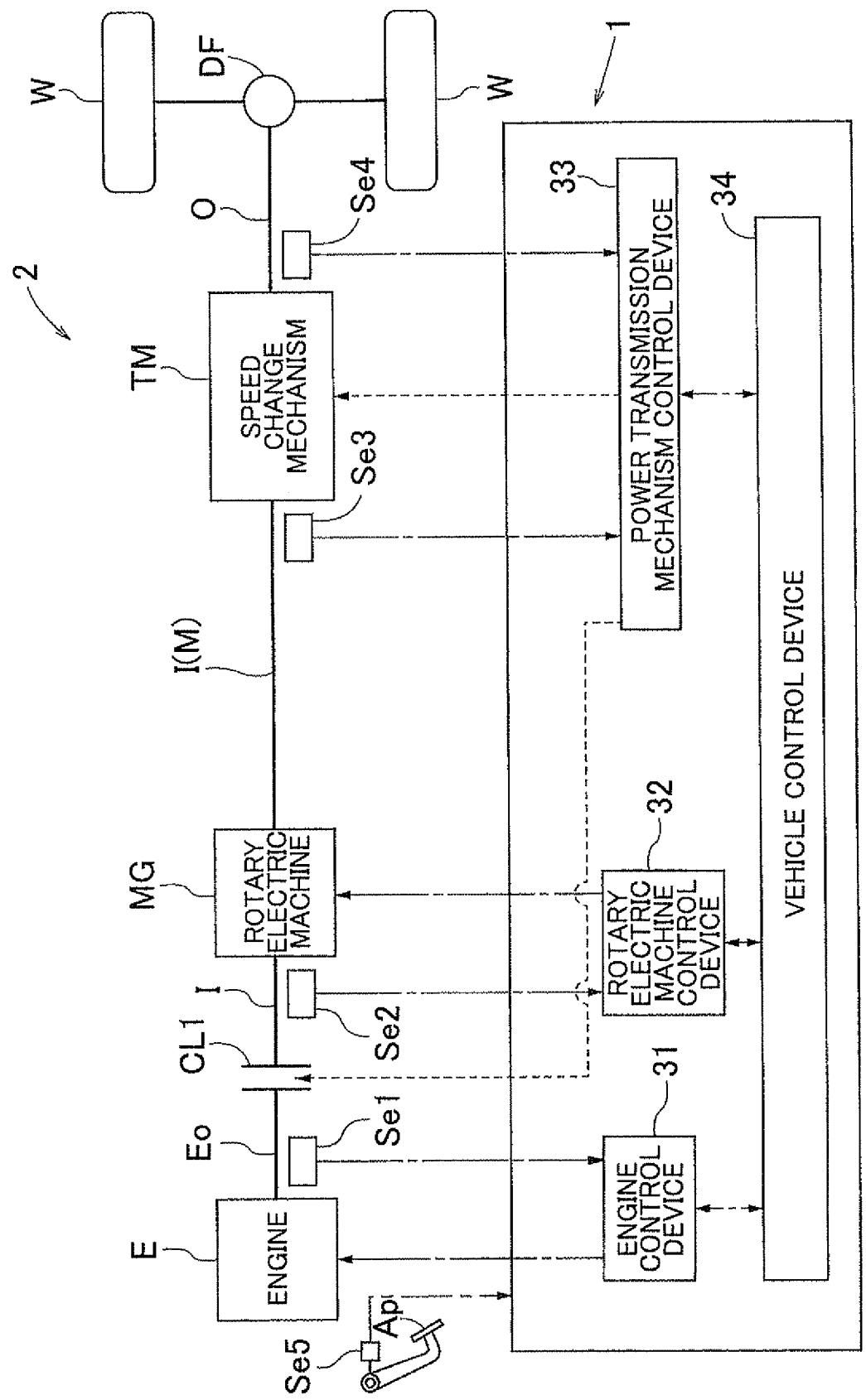
FIG. 11 is a schematic diagram that shows the configuration of a hybrid vehicle drive system and a control system according to another embodiment of the present invention.

(4) In the embodiments described above, as an example, the hybrid vehicle drive system 2 includes the torque converter TC. However, the embodiments of the present invention are not limited to this example. As shown in FIG. 11, in another preferred embodiment of the present invention, the hybrid vehicle drive system 2 does not include the torque converter TC, and is instead configured such that the input shaft I and the intermediate shaft M are integratedly and drivingly connected.

Alternatively, the hybrid vehicle drive system 2 may be configured by including a clutch similar to the transmission clutch CL1 in place of the torque converter TC, and using the clutch to selectively engage and disengage the input shaft I and the intermediate shaft M. In this case, the clutch is engaged during the parallel running transition mode.

(5) In the embodiments described above, as an example, the engagement pressure of each friction engagement element is generated by hydraulic pressure. However, the embodiments of the present invention are not limited to this example. In another preferred embodiment of the present invention, the engagement pressure is generated by an electrically generated force such as an electromagnetic force.

(6) In the first embodiment described above, as an example, during execution of the rotational speed feedback control at the starting rotational speed, the engagement pressure of the transmission clutch CL1 is increased to synchronize the rotational speeds of the engine E and the rotary electric machine MG, and engagement of the transmission clutch CL1 is completed, after which combustion in the engine E is started. In the second embodiment described above, as an example, during execution of the rotational speed feedback control at the starting rotational speed, the engagement pressure of the transmission clutch CL1 is increased to increase the rotational speed of the engine E, after which combustion in the engine E is started. Following the start of combustion in the engine E, the rotational speeds of the engine E and the rotary electric machine MG are synchronized, and engagement of the transmission clutch CL1 is completed. However, the embodiments of the present invention are not limited to these examples. During execution of the rotational speed feedback control at the starting rotational speed, any method may be used so long as the method starts combustion in the engine E by increasing the engagement pressure of the transmission clutch CL1 to increase the rotational speed of the engine E. In addition, the timing at which the rotational speeds of the engine E and the rotary electric machine MG are synchronized and the timing at which engagement of the transmission clutch CL1 is completed may come before or after the timing at which combustion in the engine E is started. Further, any method may be used for the control that synchronizes the rotational speeds of the engine E and the rotary electric machine MG, and the control that completes engagement of the transmission clutch CL1.

(7) In the embodiments described above, as an example, the input shaft request torque Ti is set near zero and the transmission of the driving force to the output shaft O is not requested in the control for the parallel running transition mode. However, the embodiments of the present invention are not limited to this example. In another preferred embodiment of the present invention, the control for the parallel running transition mode according to each embodiment is executed with the input shaft request torque Ti set to other than near zero and, for example, acceleration or deceleration requested. With this configuration as well, the transmission of torque shock that accompanies starting of the engine E and engagement of the transmission clutch to the output shaft O can be prevented.

(8) In the embodiments described above, as an example, the reference rotational speed difference $\Delta M$ is set to a value that adds a predetermined margin to the feedback control amplitude, and the starting rotational speed is set to a rotational speed that is lower than the reference rotational speed by an amount that corresponds to the reference rotational speed difference $\Delta M$. However, the embodiments of the present invention are not limited to this example. The starting rotational speed can be set to any rotational speed within a range that is at least a rotational speed lower than the reference rotational speed by a rotational speed that corresponds to the feedback control amplitude and up to a rotational speed at which combustion in the engine E can be started. Further, the starting rotational speed can be set so as to vary within the range depending on the control timing and control content of the engagement control of the transmission clutch CL1 and the start control of the engine E. Accordingly, in another preferred embodiment of the present invention, for example, the reference rotational speed difference $\Delta M$ is set so as to match the feedback control amplitude, or the starting rotational speed is set to a rotational speed that is even lower than the rotational speed that is lower than the reference rotational speed by an amount that corresponds to the reference rotational speed difference $\Delta M$.

The present invention is well suited for use in a control system that performs a control of a hybrid vehicle drive system that includes: an input member that is drivingly connected to a rotary electric machine; a clutch that selectively and drivingly connects the input member to an internal combustion engine; an output member that is drivingly connected to a wheel; and a speed change mechanism that has a plurality of shift speeds selectively formed by controlling the engagement and disengagement of a plurality of engagement elements, and changes a rotational speed of the input member by a speed ratio of the respective shift speeds and transmits the changed rotational speed to the output member.

What is claimed is:

1. A control system that performs a control of a hybrid vehicle drive system that includes an input member that is drivingly connected to a rotary electric machine; a clutch that selectively and drivingly connects the input member to an internal combustion engine; an output member that is drivingly connected to a wheel; and a speed change mechanism that includes a plurality of engagement elements, has a plurality of shift speeds selectively formed by controlling the engagement and disengagement of the plurality of engagement elements, and changes a rotational speed of the input member by a speed ratio of the respective shift speeds and transmits the changed rotational speed to the output member, wherein the speed change mechanism includes a one-way transmission speed as one of the plurality of shift speeds, the one-way transmission speed being a shift speed at which a rotary driving force is transmitted from the input member to the output member and a rotary driving force is not transmitted from the output member to the input member, and when starting combustion in the internal combustion engine under a combustion-stopped vehicle running condition in which the clutch is disengaged, combustion in the internal combustion engine is stopped, the speed change mechanism forms the one-way transmission speed, and the output member rotates, a rotational speed feedback control is executed that sets a value that multiplies a rotational speed of the output member by a speed ratio of the one-way transmission speed as a reference rotational speed of the input member, sets a starting rotational speed that is lower than the reference rotational speed as a target rotational speed, and controls the rotary electric machine such that the rotational speed of the input member matches the target rotational speed, and during execution of the rotational speed feedback control a start control is performed that increases an engagement pressure of the clutch to increase a rotational speed of the internal combustion engine and start combustion in the internal combustion engine.

2. The control system according to claim 1, wherein at least one of the plurality of engagement elements is a one-way clutch, and the one-way transmission speed is formed by the one-way clutch and engagement of at least one of the plurality of engagement elements other than the one-way clutch.

3. The control system according to claim 1, wherein once the internal combustion engine starts combustion and the clutch completes engagement, the target rotational speed is changed and set to a rotational speed that matches the reference rotational speed, and execution of the rotational speed feedback control is continued, with the rotational speed feedback control being terminated following synchronization of the rotational speed of the input member and the reference rotational speed.

4. The control system according to claim 1, wherein the combustion-stopped vehicle running condition is further a condition in which transmission of a driving force to the output member is not required.

5. The control system according to claim 1, wherein an amplitude of the rotational speed of the input member during execution of the rotational speed feedback control is a feedback control amplitude, and the starting rotational speed is set to a rotational speed that is lower than the reference rotational speed by a rotational speed that adds a predetermined margin to the feedback control amplitude.

* * * * *